(12) United States Patent
Ofek et al.

(10) Patent No.: US 7,953,372 B2
(45) Date of Patent: May 31, 2011

(54) DIRECTIONAL ANTENNA SECTORING SYSTEM AND METHODOLOGY

(76) Inventors: Yoram Ofek, Riverdale, NY (US); Bezalel Gavish, Dallas, TX (US)

( * ) Notice: Subject to any disclaimer, the term of this patent is extended or adjusted under 35 U.S.C. 154(b) by 1695 days.

(21) Appl. No.: 10/814,731

(22) Filed: Mar. 31, 2004

(65) Prior Publication Data

US 2004/0196834 A1 Oct. 7, 2004

Related U.S. Application Data

(60) Provisional application No. 60/461,003, filed on Apr. 7, 2003, provisional application No. 60/535,001, filed on Jan. 7, 2004.

(51) Int. Cl.
*H04B 15/00* (2006.01)
*H04B 17/00* (2006.01)
*H04B 1/38* (2006.01)

(52) U.S. Cl. .............. 455/63.4; 455/67.11; 455/67.14; 455/73

(58) Field of Classification Search .............. None
See application file for complete search history.

(56) References Cited

U.S. PATENT DOCUMENTS

| | | | |
|---|---|---|---|
| 5,969,689 A | 10/1999 | Martek et al. | |
| 6,070,071 A | 5/2000 | Chavez et al. | |
| 6,078,823 A | 6/2000 | Chavez et al. | |
| 6,101,399 A * | 8/2000 | Raleigh et al. | 455/561 |
| 6,157,343 A * | 12/2000 | Andersson et al. | 342/371 |
| 6,198,449 B1 * | 3/2001 | Muhlhauser et al. | 343/753 |
| 6,243,427 B1 | 6/2001 | Stockton et al. | |
| 6,278,405 B1 | 8/2001 | Ha et al. | |
| 6,393,303 B1 * | 5/2002 | Katz | 455/562.1 |
| 6,426,814 B1 * | 7/2002 | Berger et al. | 398/45 |
| 6,437,740 B1 * | 8/2002 | De Champlain et al. | 342/417 |
| 6,449,469 B1 | 9/2002 | Miyahara | |
| 6,486,832 B1 | 11/2002 | Abramov et al. | |
| 6,587,080 B1 * | 7/2003 | De Champlain et al. | 342/450 |
| 6,677,898 B2 * | 1/2004 | Cheng et al. | 342/372 |
| 6,683,567 B2 * | 1/2004 | De Champlain et al. | 342/385 |
| 6,697,017 B1 * | 2/2004 | Shmuel | 342/378 |
| 6,850,502 B1 * | 2/2005 | Kagan et al. | 370/330 |
| 7,099,697 B2 * | 8/2006 | Okawa et al. | 455/562.1 |

(Continued)

OTHER PUBLICATIONS

T.S. Rappaport, "Wireless Communications: Principles & Practice," 1999, Prentice Hall, Upper Saddle River, New Jersey, USA.

(Continued)

*Primary Examiner* — Yuwen Pan
*Assistant Examiner* — Ayodeji Ayotunde
(74) *Attorney, Agent, or Firm* — Sitrick & Sitrick

(57) ABSTRACT

Methods and systems for packet-by-packet directional mobile wireless transmission utilizing plurality of directional antenna sectors, such that, the transmission of each packet is performed by at least one selected antenna sector. The direction of transmission is selected responsive to the direction in which the best electromagnetic signal reception was received. For each plurality of data packets, the transmission direction is selected again. Switching logic is coupling the out going transmission signal to selected ones from the plurality of the antennas responsive to the motion of the mobile user. The antenna design in this invention is aimed at increasing the gain and minimizing the interfering signals with respect large number of mobile users who are concurrently and continuously tracking and communicating with their access points, and consequently, increasing the bit rate of each transmission and the aggregate capacity of the wireless system.

57 Claims, 31 Drawing Sheets

U.S. PATENT DOCUMENTS

| | | | |
|---|---|---|---|
| 2003/0117318 A1* | 6/2003 | Champlain et al. | 342/387 |
| 2003/0137451 A1* | 7/2003 | Cheng et al. | 342/372 |
| 2003/0220127 A1* | 11/2003 | Hayashi et al. | 455/562.1 |
| 2004/0038713 A1* | 2/2004 | Okawa et al. | 455/561 |
| 2004/0130488 A1* | 7/2004 | De Champlain | 342/374 |
| 2004/0196834 A1* | 10/2004 | Ofek et al. | 370/352 |
| 2004/0224637 A1* | 11/2004 | Silva et al. | 455/63.4 |
| 2005/0181794 A1* | 8/2005 | Rajkotia | 455/436 |
| 2005/0233734 A1* | 10/2005 | Rajkotia et al. | 455/414.1 |

OTHER PUBLICATIONS

J. C. Liberti and T. S. Rappaport, "Smart Antennas for Wireless Communications: IS-95 and Third-Generation CDMA," 1999, ISBN: 0-13-719287-8, Prentice Hall, New Jersey, USA.

IEEE 802.11—wireless LAN (local area network), Jun. 1997, ISBN: 1-55937-935-9.

Benjamin Rulf, Gregory A. Robertshaw (Contributor), "Understanding Antennas for Radar Communications and Avionics (Van Nostrand Reinhold Electrical/Computer Science and Engineering Series)," May 1987, 335 pages, ISBN: 0442277725, Kluwer Academic Publishers.

Lal C. Godara, "Applications of Antenna Arrays to Mobile Communications, Part I: Performance Improvement, Feasibility, and System Considerations," Jul. 1997, pp. 1031-1060, Proceedings of the IEEE, vol. 85, No. 7.

Lal C. Godara, "Applications of Antenna Arrays to Mobile Communications, Part II: Beam-Forming and Direction-of-Arrival Considerations," Aug. 1997, pp. 1195-1245, Proceedings of the IEEE, vol. 85, No. 8.

Martin Cooper and Marc Goldburg, "Intelligent Antennas: Spatial Division Multiple Access," 1996, pp. 999-1002, 1996 Annual Review of Communications.

M. Cooper, "Antennas get Smart," Jul. 2003, pp. 48-55, Scientific American.

Bertoni, H.L.., "Radio Propagation for Modern Wireless Systems", 2000, ISBN 0130263737, Prentice Hall.

IEEE Std 802.16-2001, Part 16: Air Interface for Fixed Broadband Wireless Access Systems.

IEEE Std 802.15.1-2002, Part 15.1: Wireless Medium Access Control (MAC) and Physical Layer (PHY) Specifications for Wireless Personal Area Networks (WPANs).

* cited by examiner

Fig. 6

Antenna System (AS) - 150
Spatial Receiving Controller
Spatial Transmitting Controller
Receiver – RRF
Transmitter – TRF
N-to-R Switch
T-to-N Switch Each Side (Face) With Multiple Patches See Figs. 21-22

640 Antenna Sectors on a PENTAGONDODECAHEDRON

630 Antenna Sectors on an OCTAHEDRON

610 Antenna Sectors Arranged on a Cylinder

Each Flat Side (Face) With Multiple "Patches" See Figs. 21-22

620 Antenna Sectors On a Cube

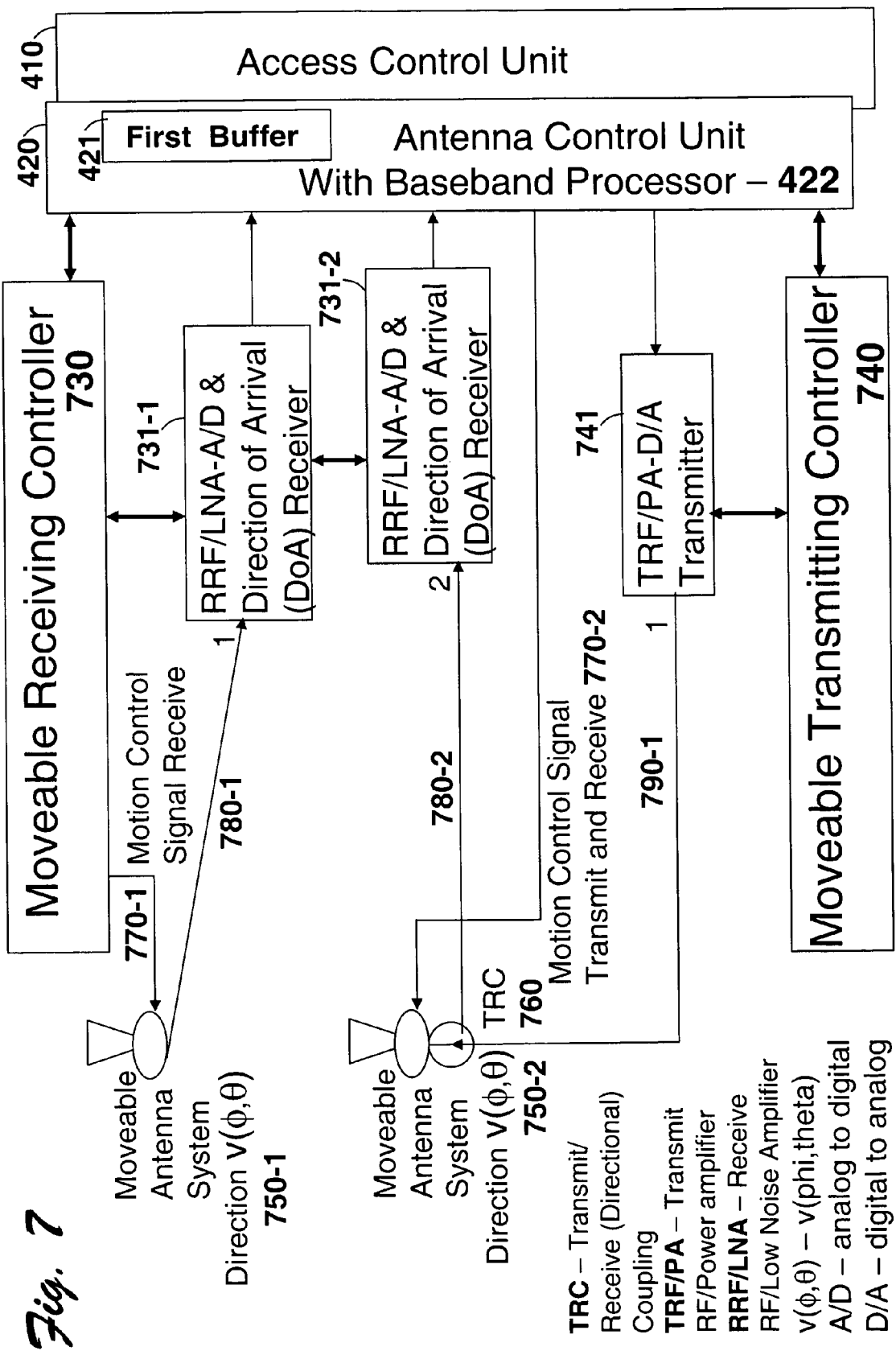

Fig. 19 End (Mobile) Device Transmits and Receives on Different Frequencies – Selecting Transmit Antenna Sector

Fig. 25

Flat Panel Antenna Sector Design

2511. $g_{max} \approx 4*(3.14)*\{(L1*L2)/(Lambda^2)\}$ [Lambda = speed-of-light/Frequency] [A=L1*L2 is the rectangular area of antenna aperture in $cm^2$]

2512. Lambda/L1 and Lambda/L2 are the beam widths – in radians (57.3 degrees)

2513. Antenna Gain: $G(db) = 10 \log_{10}(g_{max}) \approx 10 \log_{10}[12.5*A / Lambda^2]$

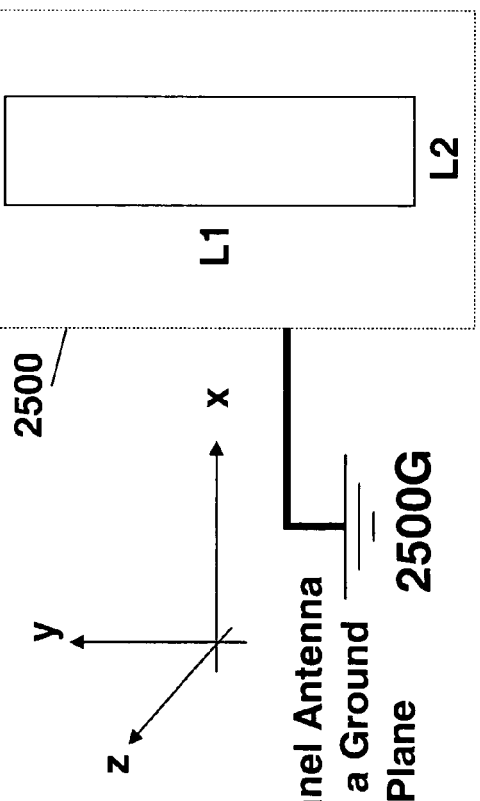

L1-by-L2
Flat Panel Antenna Sector
Wherein:
- L1 is in the x-y plane
- L2 is in the z direction – 90 degree with respect to the x-y plane
However:
- L1 may be tilted in the z direction
- L2 may be tilted in a defined angle with respect to the x-y plane Flat Panel Antenna with a Ground Plane  2500G

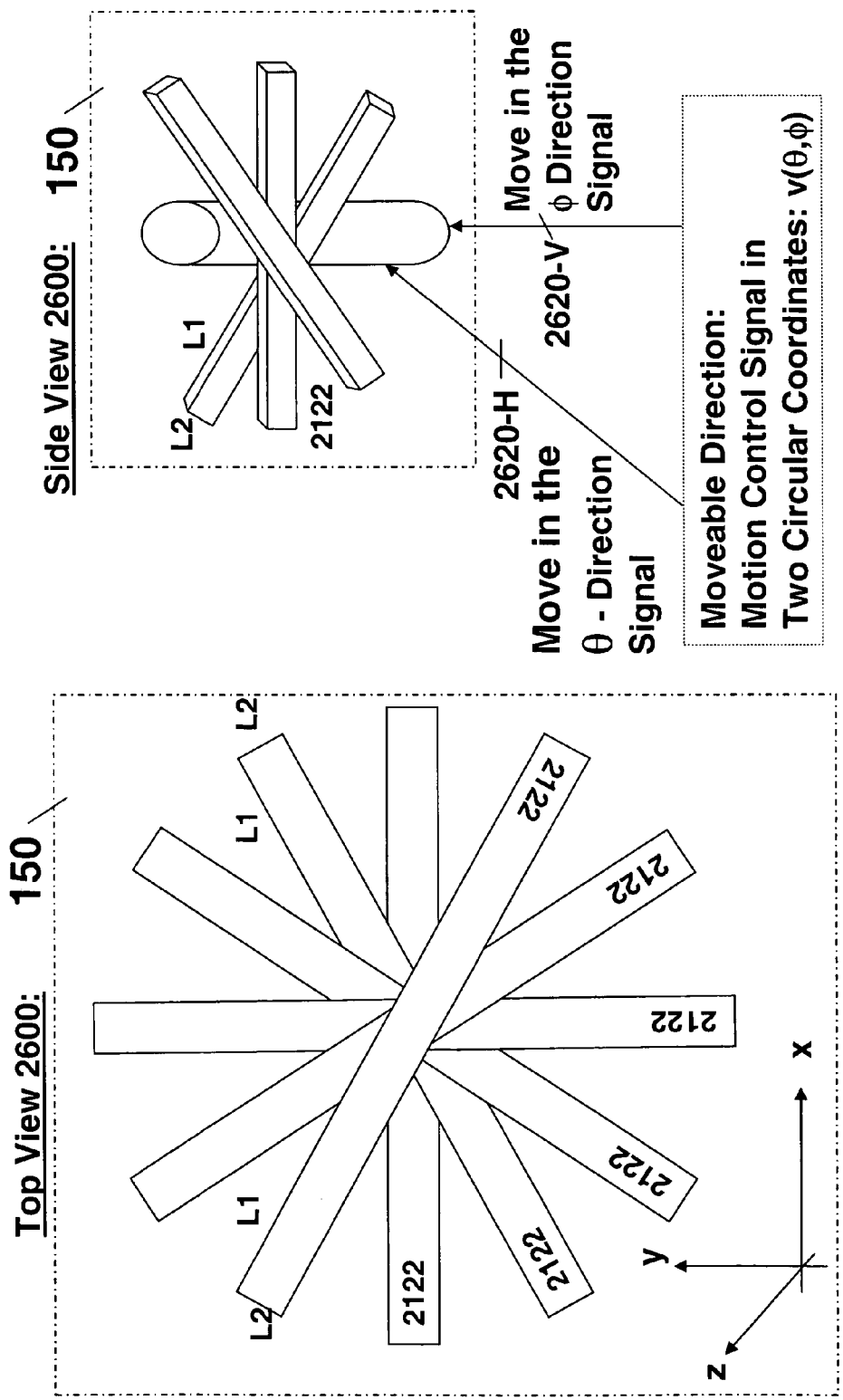
Fig. 26 Plurality of Vertically Stackable Flat Panel Antenna Sectors
- Each sector consists of plurality of "patches" may be tilted along L1 and/or L2
- Ground and dielectric planes are not shown

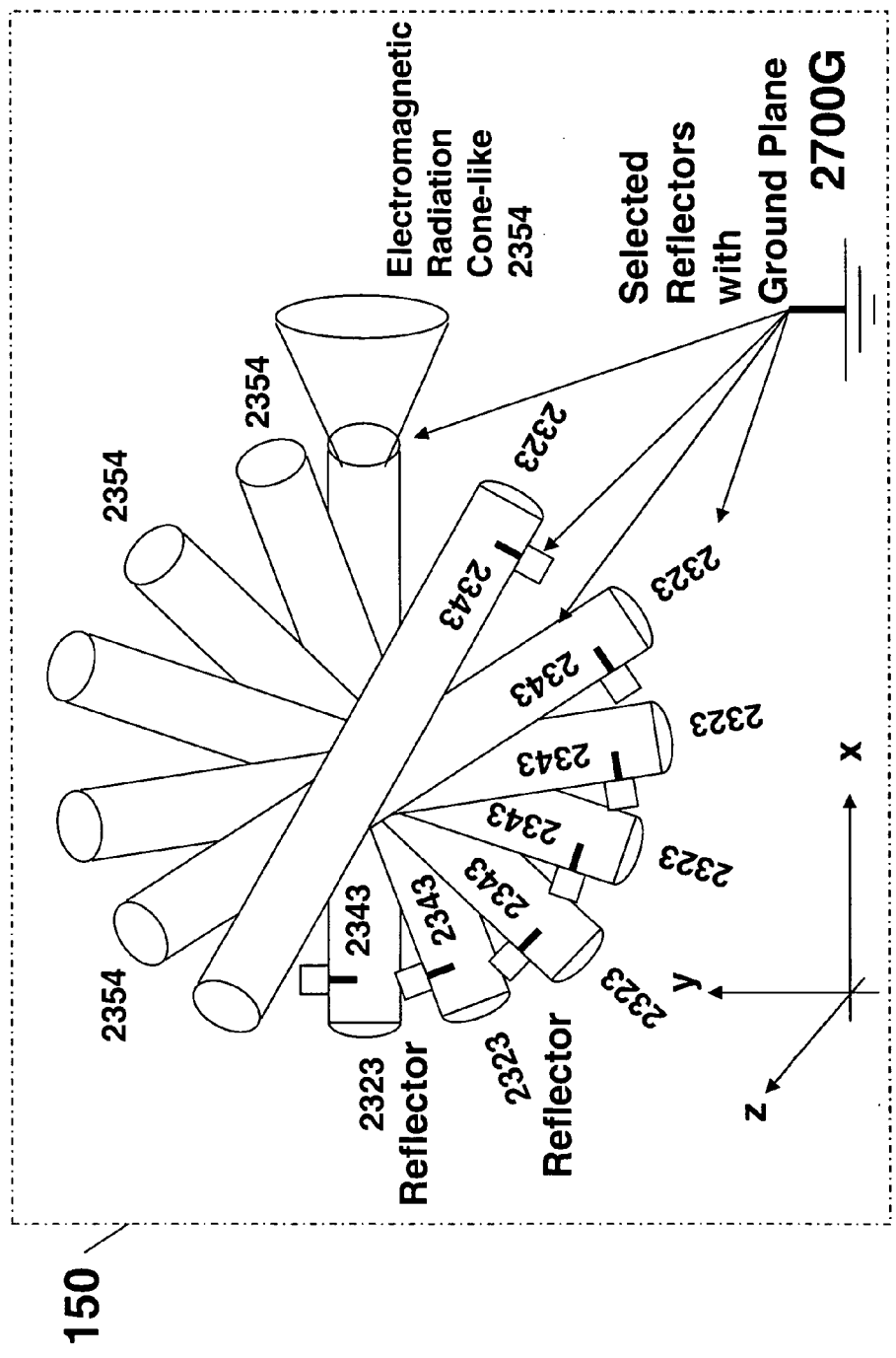
Fig. 27 Plurality of Vertically Stackable Tube-like/Yagi Antenna Sectors

DIRECTIONAL ANTENNA SECTORING SYSTEM AND METHODOLOGY

RELATED APPLICATIONS

This Application claims priority from Provisional Applications: Ser. No. 60/461,003, filed: Apr. 7, 2003; Ser. No. 60/535,001, filed: Jan. 7, 2004.

FEDERALLY SPONSORED RESEARCH OR DEVELOPMENT

Not Applicable.

BACKGROUND OF THE INVENTION

Mobile and wireless communications are exhibiting explosive growth—evident by the continued growth of cellular systems, 802.11-based data communications and the increased demand for broadband-based communications. The Internet's success results from IP architecture's robustness, flexibility, and ability to scale over multiple wired networks. The Internet is in the process of expanding to wireless and ad-hoc networking environments. Wireless environments will be able to support mobility—a feature that is desired by the highly dynamic user community. One of the main constraints limiting the spread of wireless networking is that systems supporting mobile communications have considerably less transmission capacity than wire-based networks. This invention introduces a novel wireless communications and antenna design in order to significantly increase the number of users that systems can support, and increase wireless networks' aggregate transmission capacities.

The field of the invention is antenna system design for wireless data networks, by dividing three-dimensional space into multiple regions or sectors, wherein the antenna system design primarily occupies one sector of the space. Consequently, it is possible to use the same frequency at the same time in non-interfering parts of three-dimensional space. A similar concept of sectoring has been used in cellular-based systems, however this invention uses a different approach by which the sectoring, the specific antenna structure and the channel selection process is done dynamically (packet-by-packet) both in an access point and a mobile device. Energy can then be channeled to the antenna module, which will maximize communication efficiency, and reduce power requirements that are important for mobile users who don't have fixed power sources.

The field of the invention further relates to smart antenna design, e.g.: phased array antennas, SDMA (space division multiple access) antennas, spatial processing antennas, digital beam-forming antennas, ceramic antennas, strip antennas, adaptive antenna systems, flat panel antennas, etc. Smart antenna systems can be characterized as either switched-beam or beam-forming systems, with the following distinctions regarding the choices in transmission strategy:

Switched-beam antenna systems form multiple fixed-beams with heightened sensitivity in predefined directions. These antenna systems detect signal strength, choose from one of several predetermined fixed-beams, and switch from one beam to another as the mobile moves throughout the sector. Instead of shaping the directional antenna pattern with the metallic properties and physical design of a single element (e.g., a sectorized antenna), switched-beam systems combine the outputs of multiple antennas in such a way as to form finely sectorized (directional) beams with more spatial selectivity than can be achieved with conventional, single-element approaches.

Beam-forming antennas have an infinite number of patterns that are adjusted in real-time. Using a variety of signal-processing algorithms, the adaptive system takes advantage of its ability to effectively locate and track various types of signals to dynamically minimize interference and maximize intended signal reception.

Both switched-beam antennas and beam-forming antennas attempt to increase gain and minimize interfering signals according to the location of the individual user. The system and antenna designs in this invention are aimed at increasing gain, reducing power requirements and minimizing interfering signals with respect to a large number of mobile users who are concurrently and continuously tracking and communicating with their respective access points.

In addition to these techniques, smart antennas provide a new method of multiple access to the users, which is known as space division multiple access (SDMA). The SDMA scheme, sometimes referred to as space diversity, uses smart antennas to provide control of space by providing virtual channels in an angle domain. With the use of this approach, simultaneous calls in various different cells can be established at the same carrier frequency. SDMA complements CDMA (code division multiple access) and TDMA (time division multiple access) by increasing the number of users that can access an existing wireless phone or data system by exploiting the spatial characteristics of the channel itself through highly developed implementation of an intelligent antenna system's capabilities for receiving and transmitting.

SDMA antenna systems are used on board various satellite systems. SDMA permits multiple signals of different polarization to simultaneously access the same satellite transponder. Users share a common frequency, but are separated by spatial processing. With SDMA, satellites may achieve signal separation by using beams with horizontal, vertical or circular polarization. This technique allows multiple beams to cover the same earth surface areas. Additionally, the satellite could achieve spatial separation by using separate antennas or a single antenna with multiple beams.

The following is a list of a prior art and background references that are relevant and are used as the foundation of this invention: [T. S. Rappaport, Wireless Communications: Principles & Practice, Prentice Hall, Upper Saddle River, N.J., 1999]; [J. C. Liberti and T. S. Rappaport, Smart Antennas for Wireless Communications: IS-95 and Third-Generation CDMA, Prentice Hall, New Jersey, USA. 1999, ISBN 0-13-719287-8]; [IEEE 802.11-wireless LAN (local area network)]; [IEEE Std 802.16-2001, Part 16: Air Interface for Fixed Broadband Wireless Access Systems]; [IEEE Std 802.15.1-2002, Part 15.1: Wireless Medium Access Control (MAC) and Physical Layer (PHY) Specifications for Wireless Personal Area Networks (WPANs)]. Specific antenna design considerations are taught in [Understanding Antennas for Radar Communications and Avionics (Van Nostrand Reinhold Electrical/Computer Science and Engineering Series) by Benjamin Rulf, Gregory A. Robertshaw (Contributor); 335 pages; Kluwer Academic Publishers; May 1987, ISBN: 0442277725]. Various issues that are related to radio propagation of mobile cellular system are discussed in [Bertoni, H. L., "Radio Propagation for Modern Wireless Systems", Prentice Hall, ISBN 0130263737, 2000].

The two articles [LAL C. GODARA, "Applications of Antenna Arrays to Mobile Communications, Part I: Performance Improvement, Feasibility, and System Considerations," PROCEEDINGS OF THE IEEE, VOL. 85, NO. 7, JULY 1997, pp. 1031-1060; and LAL C. GODARA, "Applications of Antenna Arrays to Mobile Communications, Part II: Beam-Forming and Direction-of-Arrival Considerations," PROCEEDINGS OF THE IEEE, VOL. 85, NO. 8, AUGUST 1997, pp. 1195-1245] and the extensive list of references therein covers many of the current antenna designs for mobile communications. The following two articles further cover issues related to smart antennas and space division multiple access: [Martin Cooper and Marc Goldburg, "Intelligent Antennas: Spatial Division Multiple Access," 1996 ANNUAL REVIEW OF COMMUNICATIONS, pp. 999-1002; and M. Cooper, Antennas get. Smart, Scientific American, July 2003, pp. 48-55].

PRIOR ART

The following examines related patents to this current patent application. The invention describes in ["Direction-agile antenna system for wireless communications," U.S. Pat. No. 6,486,832, Abramov, et al., Nov. 26, 2002] discloses an antenna steered by an electromechanical device in the direction that ensures maximal quality of the incoming signal.

The invention described in ["AI antenna driving device and method for controlling the same," U.S. Pat. No. 6,278,405, Ha, et al., Aug. 21, 2001] tries to overcome the limitations of a fixed antenna by using a mechanical antenna steering mechanism to improve reception and transmission.

The invention described in ["Multiple antenna cellular network," U.S. Pat. No. 6,070,071, Chavez, et al., May 30, 2000; "Multiple antenna cellular network," U.S. Pat. No. 6,078,823, Chavez, et al., Jun. 20, 2000] concentrates on cellular communication networks. It proposes a multiple antenna cellular network communicates with a mobile station over a plurality of antennas. The antennas are arranged in a plurality of positions to customize a cell or cells. A transceiver is coupled to the antennas and configured to receive inbound information from the mobile station and transmit outbound information to the mobile station. A processor is coupled to the transceiver and configured to decode the inbound information and to encode the outbound information to communicate with the mobile station. In another embodiment, the antennas are similarly deployed to create a cell or cells. The transmit signal power is continuously modified to improve quality and to move the nulls so that a fixed location user can receive a high quality signal. A cell can be served by multiple antennas overcoming the limitations imposed by conventional cellular systems. Communications are supported through walls, ceilings, floors and buildings to reduce interference, improve performance and improve quality of service.

Exemplary embodiments are provided for use with the Global Systems for Mobile Communication (GSM) protocol and can be applied to other digital technologies. The invention described in ["Switched directional antenna for automotive radio receivers," U.S. Pat. No. 6,449,469, Miyahara Sep. 10, 2002] proposes a method for improving communications from and to a moving vehicle. It relates, in general, to a mobile radio receiver with reduced distortion and reduced signal fading, and more specifically, to a switched directional antenna utilizing predetermined antenna patterns aligned with the front, hack, left and right sides of a mobile vehicle. A primary source of noise and distortion in radio receivers is derived from multi-path interference. This is a localized effect resulting from interaction between separate signals from a transmitter, which traverse different paths (e.g., via reflections) to reach a receiving antenna. Because of the superposition of several signals (e.g., echoes and direct waves), the signal strength of the received signal changes drastically and may fall below the noise floor. Based upon the differences in path lengths of each received wave, the multi-path distortion or fading may include short-time delayed multi-path interference and/or long-time delayed multi-path interference signals.

A well-known means for reducing multi-path distortion is through use of space-diversity antennas in a radio receiver system. By switching between antenna signals from spaced apart antennas. Specific multi-path events can be avoided if the antenna spacing is enough to insure that both antennas will not experience the same multi-path event at the same time. By using the different antennas placed on the vehicle it is possible to reduce the multi-path effect and improve the communication system performance.

The invention described in ["Multi-sector pivotal antenna system and Method," U.S. Pat. No. 5,969,689, Martek, et al., Oct. 19, 1999] proposes using an omni-directional coverage multi-beam antenna composed of facets or antenna modules that comprise a regular polygon of n sides inscribed in a circle of radius r which defines an adjustable composite conical surface. The antenna modules are independent antenna arrays creating an independent beam. One advantage of such a system is that the radiated wave front associated with such antenna modules is always substantially broadside to the array resulting in limited scan loss effects. Furthermore, the independence of the disclosed antenna modules is important as it allows each module's beam to be either electrically or mechanically steered to affect elevation or directional beam control. The individual antenna modules can be steered to be directed within the area covered by a module to optimize communications capability.

SUMMARY OF THE INVENTION

The present invention relates to the concept of sectoring in cellular phone systems. Existing wireless networking systems are based upon assigning a channel (frequency, time or code) to a mobile user. The channel remains assigned to his mobile device until a significant reduction in his signal to noise ratio is detected, at which point a network control system attempts to find an available channel which can serve him and assigns the user to that channel. This process is repeated throughout the session.

The present invention is not restricted to cellular communication systems—an access point and/or a mobile unit can have multiple directional antennas, each directed to a different sector of three-dimensional space, and the antenna selection is done packet-by-packet. This allows for a packet-by-packet decision and reduces the delay from received signal to transmission and improves the system response time.

The approach presented in this invention is distinguished in several ways:
1. Antenna design: the use of several antennas each pointing to a different sector (direction). By listening to the incoming signals, a control system detects which antenna receives the best signal to noise ratio from a mobile user and directs the next packet for that user to be sent through that antenna sector.
2. The detection and decision making is done packet-by-packet—taking advantage of the best available current information.
3. Gains are achieved by increasing the range (distance) that a mobile user and an access point can communicate by directing the transmission power to a single sector. By directing the transmission energy in a single direction, it is possible to reduce the interference between different devices and support an increased number of mobile users that can be served by a single access point.
4. The energy required for effective communication is reduced and will decrease the battery drainage from a mobile user device, thus extending the amount of time between battery charges when users are closer to the access point.
5. The design allows a device to simultaneously communicate with several access points—increasing the transfer rate from and to the mobile device. Additionally, a mobile device serves as a relay node between access points and mobile devices, and between mobile-to-mobile devices.

The basic concept is that a device (mobile or static), is equipped with multiple directional antennas (modules) which divide space into sectors. The signals arriving through each sector are continuously analyzed; identifying which sector provides the best incoming signal from each access point or other mobile units. When the device/access point has to transmit a packet to another device it selects the antenna sector that had the best reception from the receiving device and directs the transmission power to that sector. This process is repeated until the communication session is terminated or until no further communication is possible between the two parties.

The present invention claims multiple designs of previously discussed directional antennas; systems to receive signals, store and analyze them; a general architecture to select the transmission antenna module and methods to transfer the transmitted packet to the appropriate antenna module. More specifically, this invention is related to a wireless system for transmitting and receiving a plurality of data packets. The wireless system comprises a plurality of directional antenna sectors, at least one receiving controller and at least one transmitting controller. Each directional antenna sector, when coupled to a selected one of the transmitting controllers, transmits an electromagnetic signal in a defined region in three-dimensional space. A selected one of the receiving controllers is selectively coupled to at least one of the directional antenna sectors in order to measure the received electromagnetic signal characteristics. A selected one of the receiving controllers selects at least one of the directional antenna sectors within a first predefined time interval prior to the transmission of at least one data packet responsive to the received electromagnetic signal characteristics. A selected one of the transmitting controller is selectively coupled to at least one of the directional antenna sectors in order to transmit at least one data packet via the directional antenna sectors selected by the receiving controller.

Methods and systems for packet-by-packet directional mobile wireless transmission utilizing plurality of directional antenna sectors are claimed, such that the transmission of each packet is performed by at least one selected antenna sector. The direction of transmission is selected responsive to the direction from which the best electromagnetic signal reception was received. For each plurality of data packets, the transmission direction is selected again. Switching logic couples the out-going transmission signal to selected ones from the plurality of the antennas responsive to the motion of the mobile user. The antenna design in this invention is aimed at increasing the gain and minimizing the interfering signals with respect to large numbers of mobile users who are concurrently and continuously tracking and communicating with their access points, and consequently, increasing the bit rate of each transmission and the aggregate capacity of the wireless system.

The MDs are connected to BS via a wireless link by using an antenna system (AS). The AS is comprised of a plurality of antenna sectors.

Figure 2:
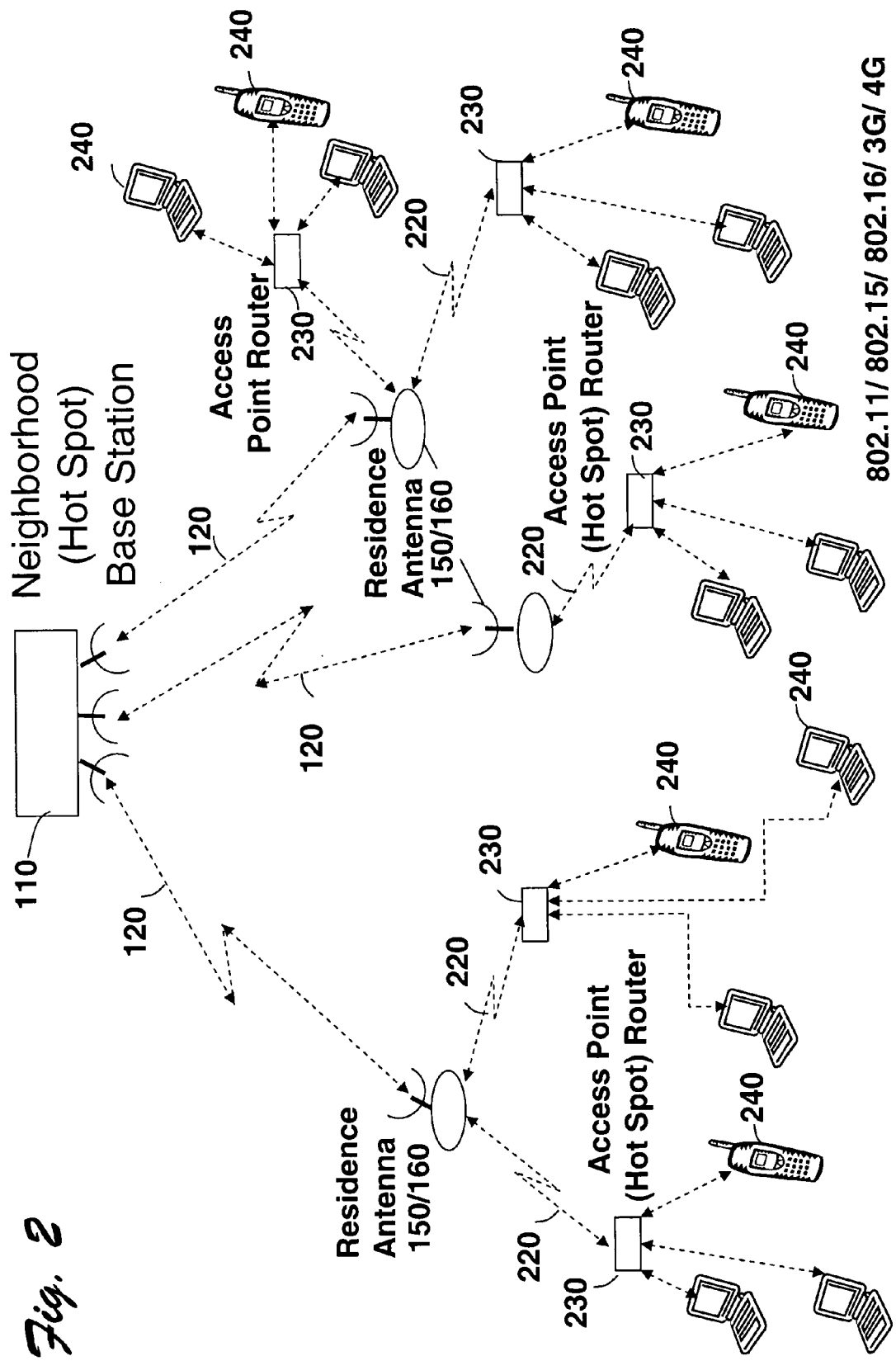

FIG. 2 is a deployment scenario utilizing the proposed system in a residential neighborhood. In this deployment scenario, the neighborhood base station is connected by means of wireless links to residence antennas. The residence antenna is connected to access point routers via wireless or wired links. Various mobile and fixed devices are connected to the access point routers by means of wireless or wired links.

Figure 3:
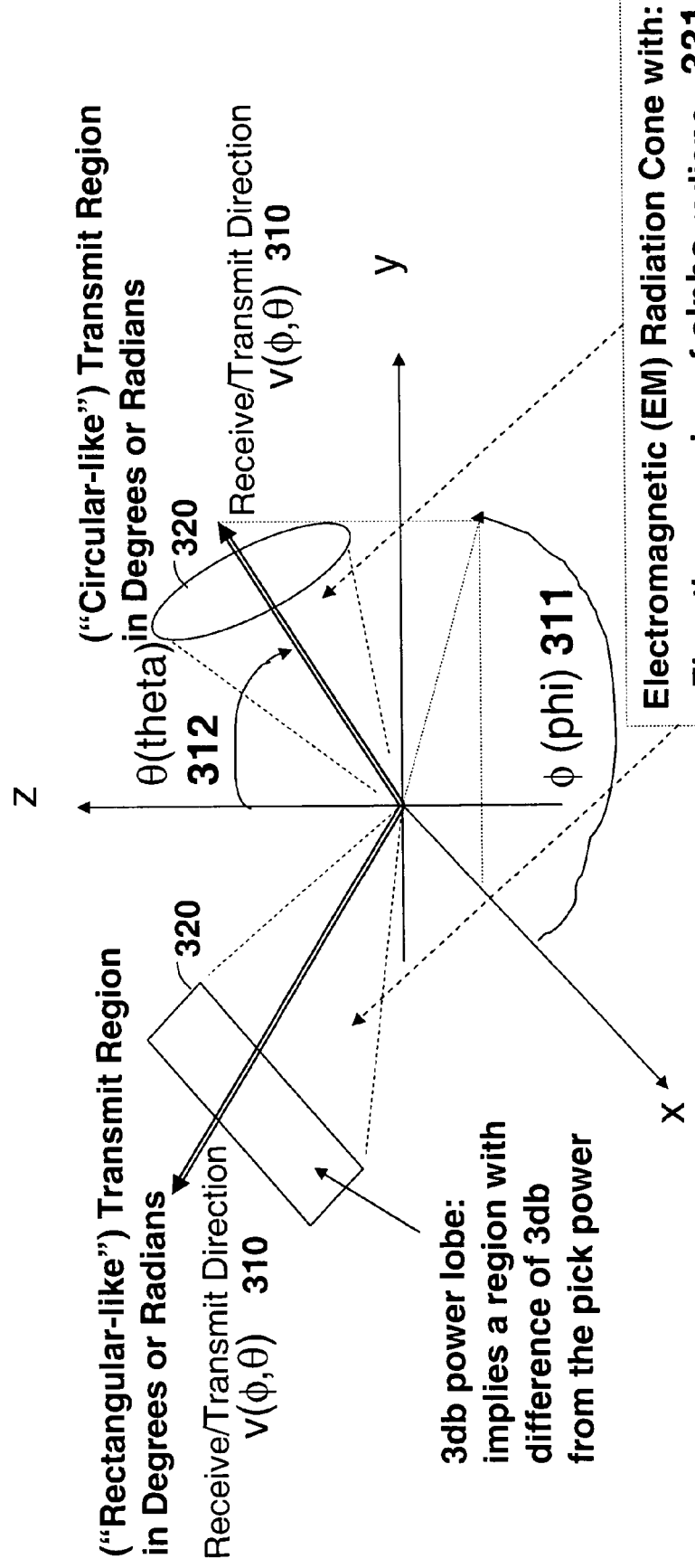

FIG. 3 is a geometrical definition of an antenna sector electromagnetic radiation in three-dimensional (3-D) space.

Figure 4:
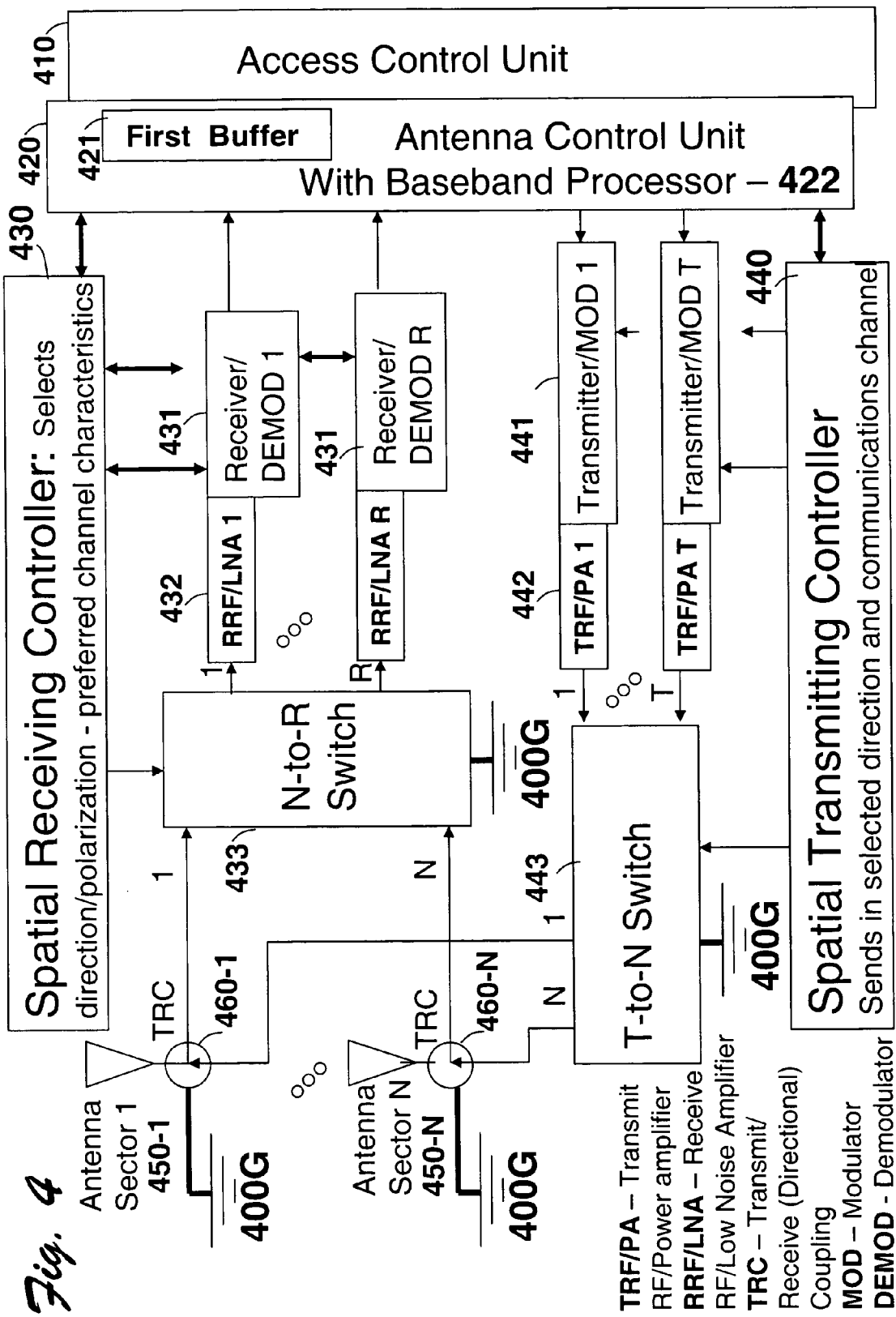

FIG. 4 is a functional description of the mobile device (MD) and the antenna system (AS) that is comprised of N antenna sectors coupled to an antenna control unit by means of switches, transmit/receive coupling (TRC), TRF (transmit radio frequency), RRF (receive radio frequency), receivers and transmitters. Specifically, in this functional description, the TRFs are located to couple the transmitters to the T-to-N switch and the RRFs are located to couple the receivers to the N-to-R switch.

Figure 5:
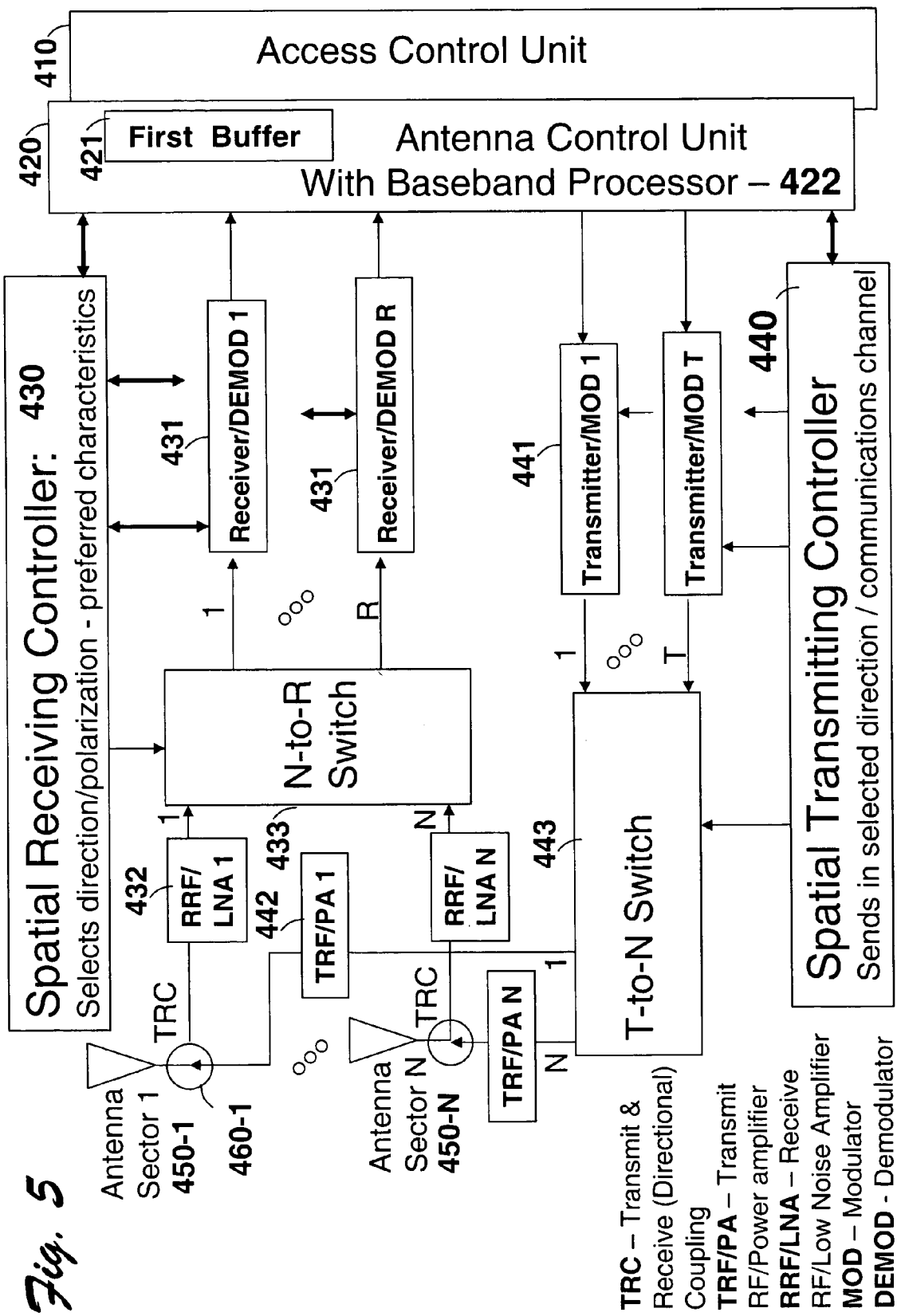

FIG. 5 is a functional description of the mobile device (MD) and the antenna system (AS) that is comprised of N antenna sectors that are coupled to an antenna control unit by means of switches, transmit/receive coupling (TRC), TRF (transmit radio frequency), RRF (receive radio frequency), receivers and transmitters. Specifically, in this functional description, the TRFs are located to couple the T-to-N switch to the TRCs and the RRFs are located to couple the TRCs to the N-to-R switch.

FIG. 6 is a three-dimensional diagram of an antenna system with a plurality of antenna sectors in a selected configuration o with six antenna sectors with cylindrical arrangement 610, a cubic configuration with six for antenna sectors 620, a double pyramid, or octahedron, configuration with eight antenna sectors 630, and a polyhedron—pentagondodecahedron—configuration with twelve antenna sectors 640.

FIG. 7 is a system configuration of an antenna system that is comprised of two moveable antenna systems that rotate in three-dimensional (3-D) space.

Figure 8:
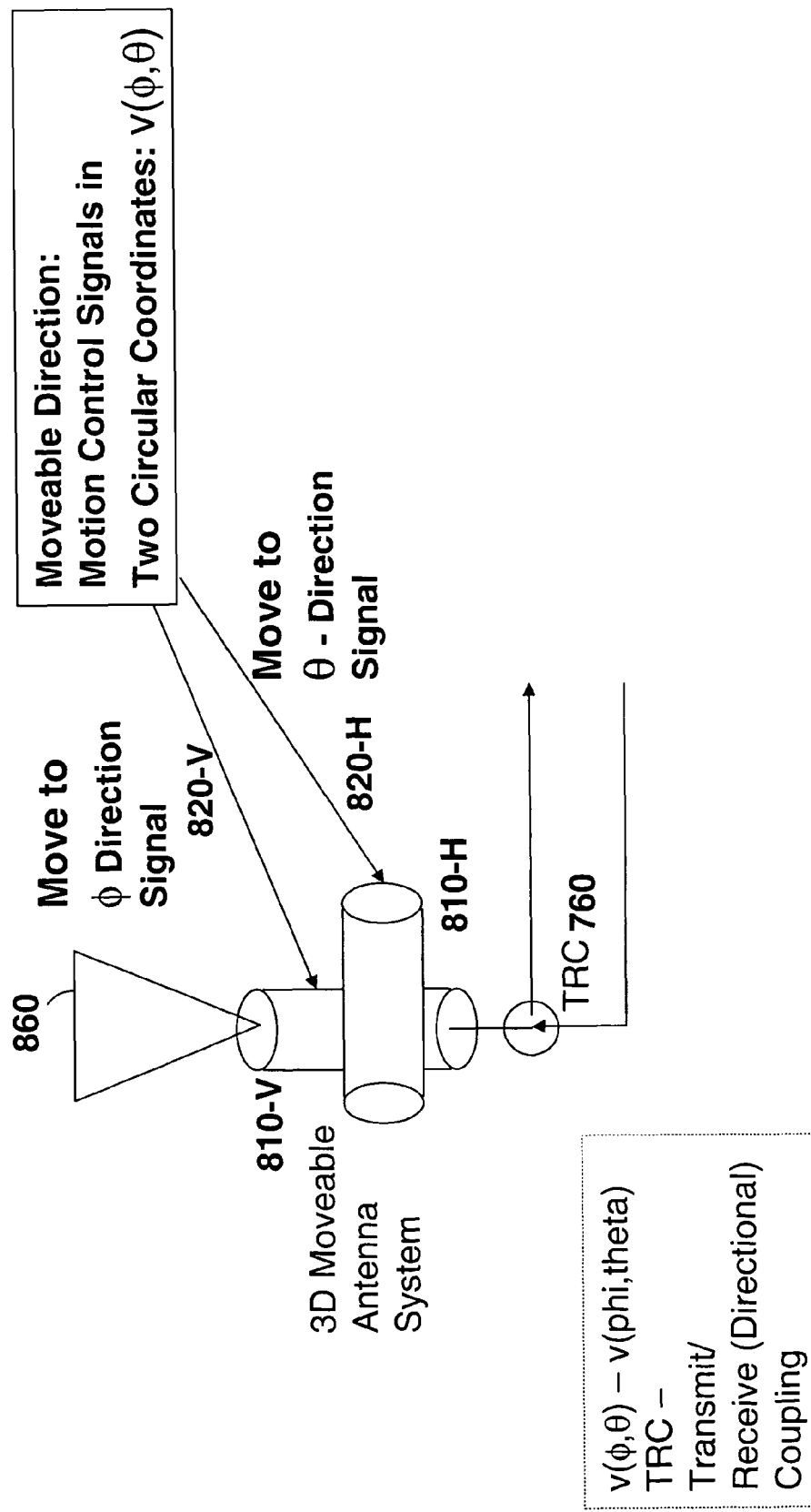

FIG. 8 is a diagram of a moveable antenna system that can be directed in 3-D space by means of two motors.

Figure 9:
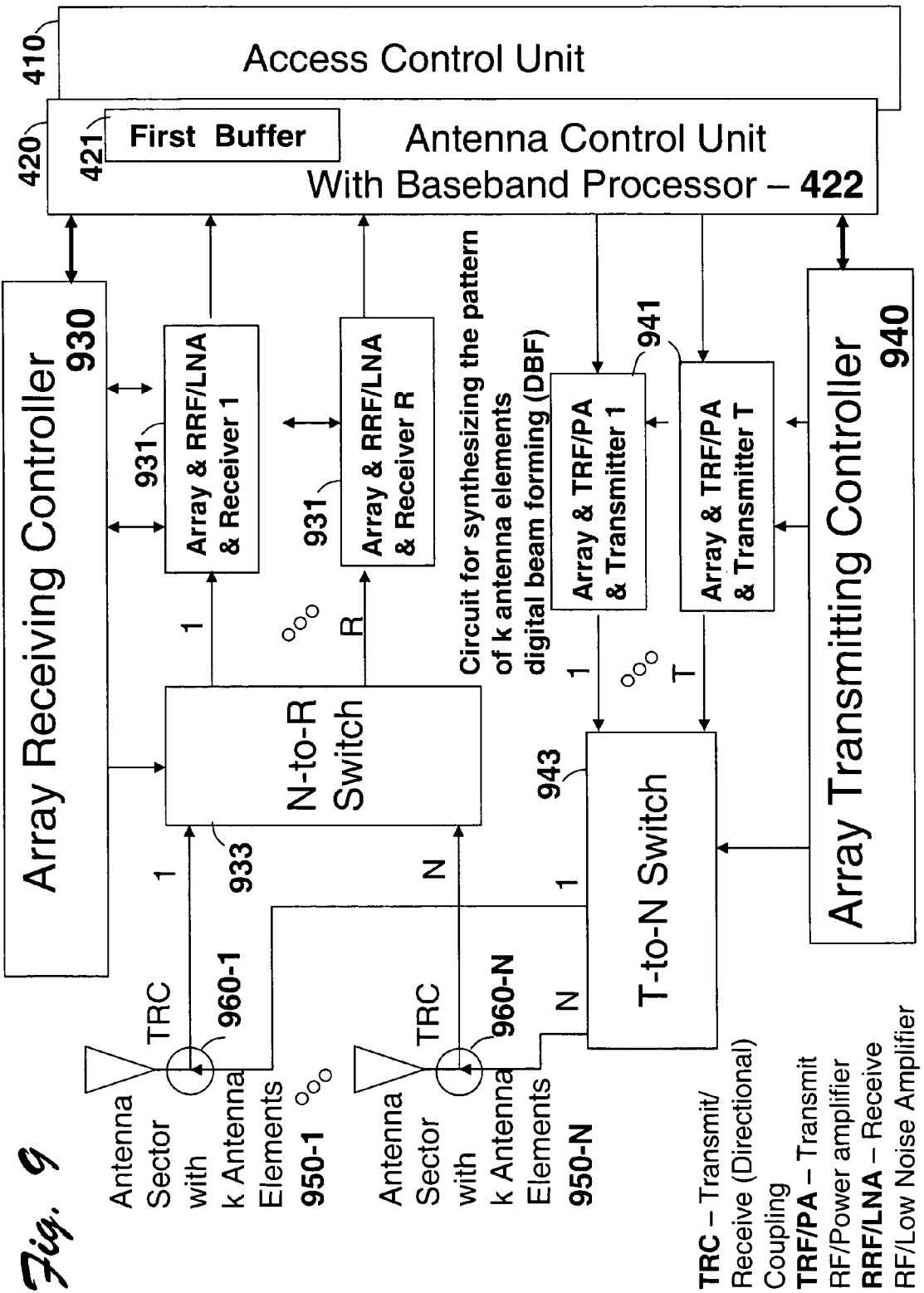

FIG. 9 is a system configuration of an antenna system that is comprised of a plurality of antenna sectors—each comprised of a plurality of antenna elements.

Figure 10:
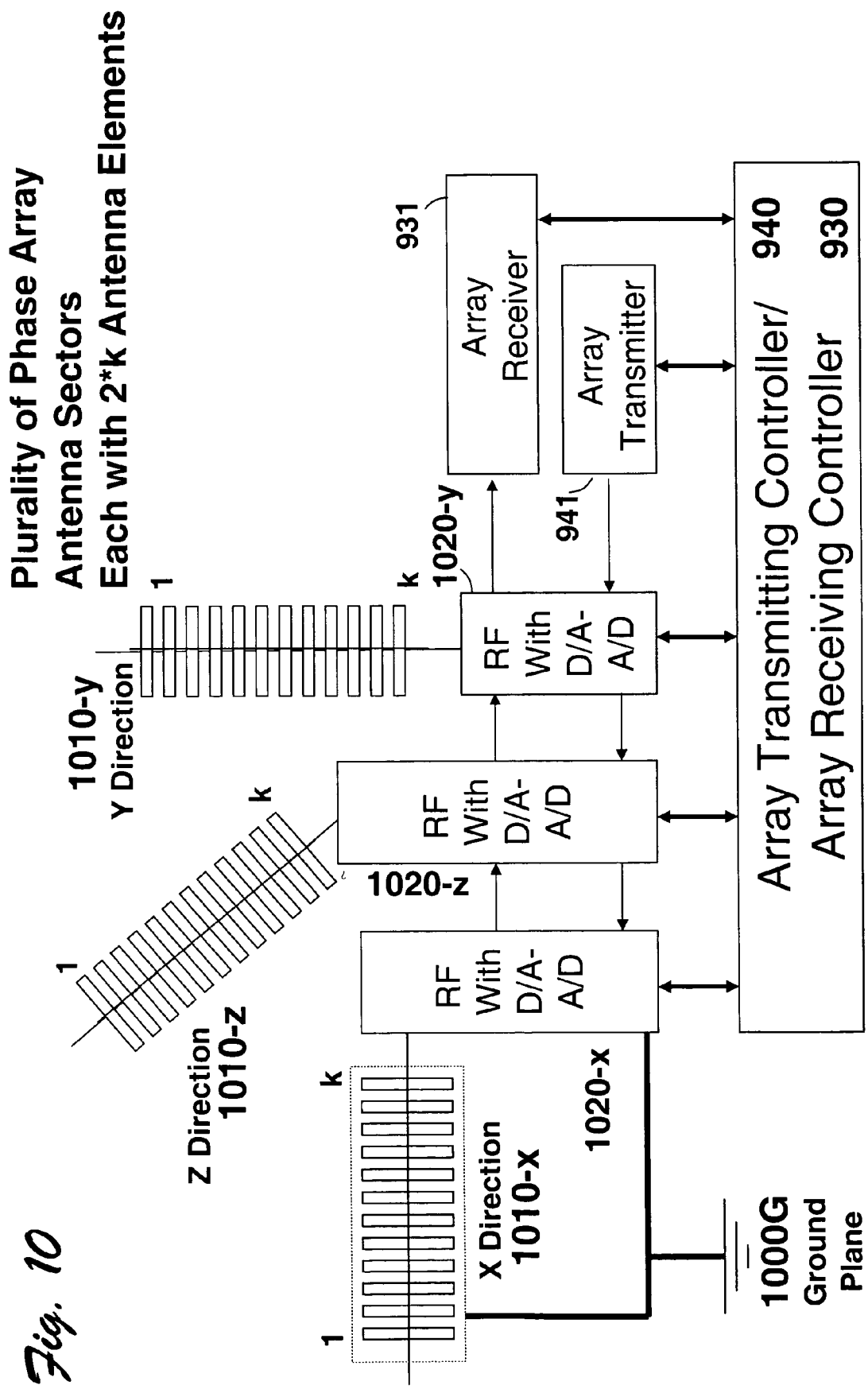

FIG. 10 is a diagram of three antenna segments in the x, y and z directions—each comprised of k antenna elements with a reference ground plane.

Figure 11:
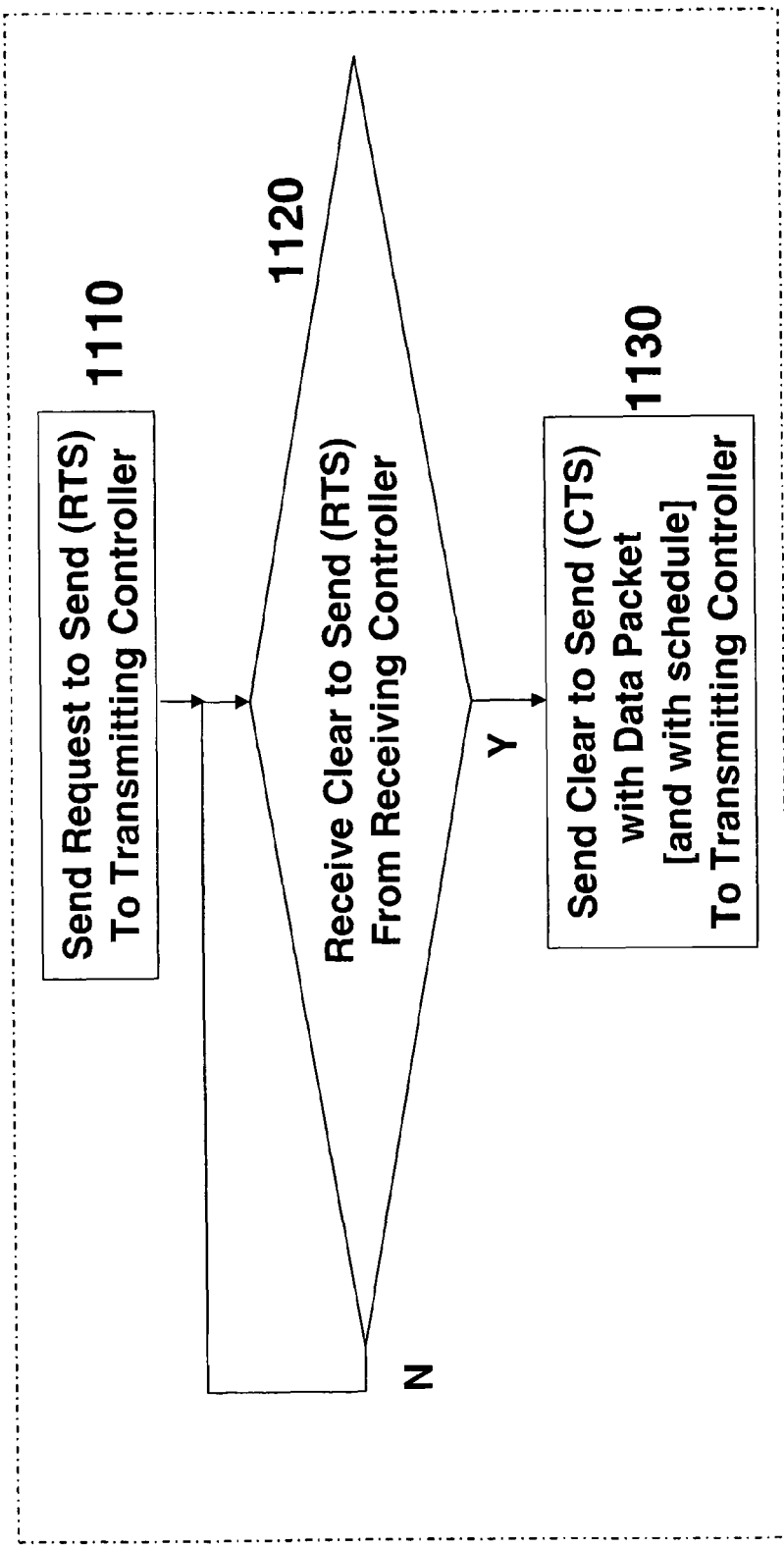

FIG. 11 is a flow chart describing the operation of send data packet procedure in the access control unit.

Figure 12:
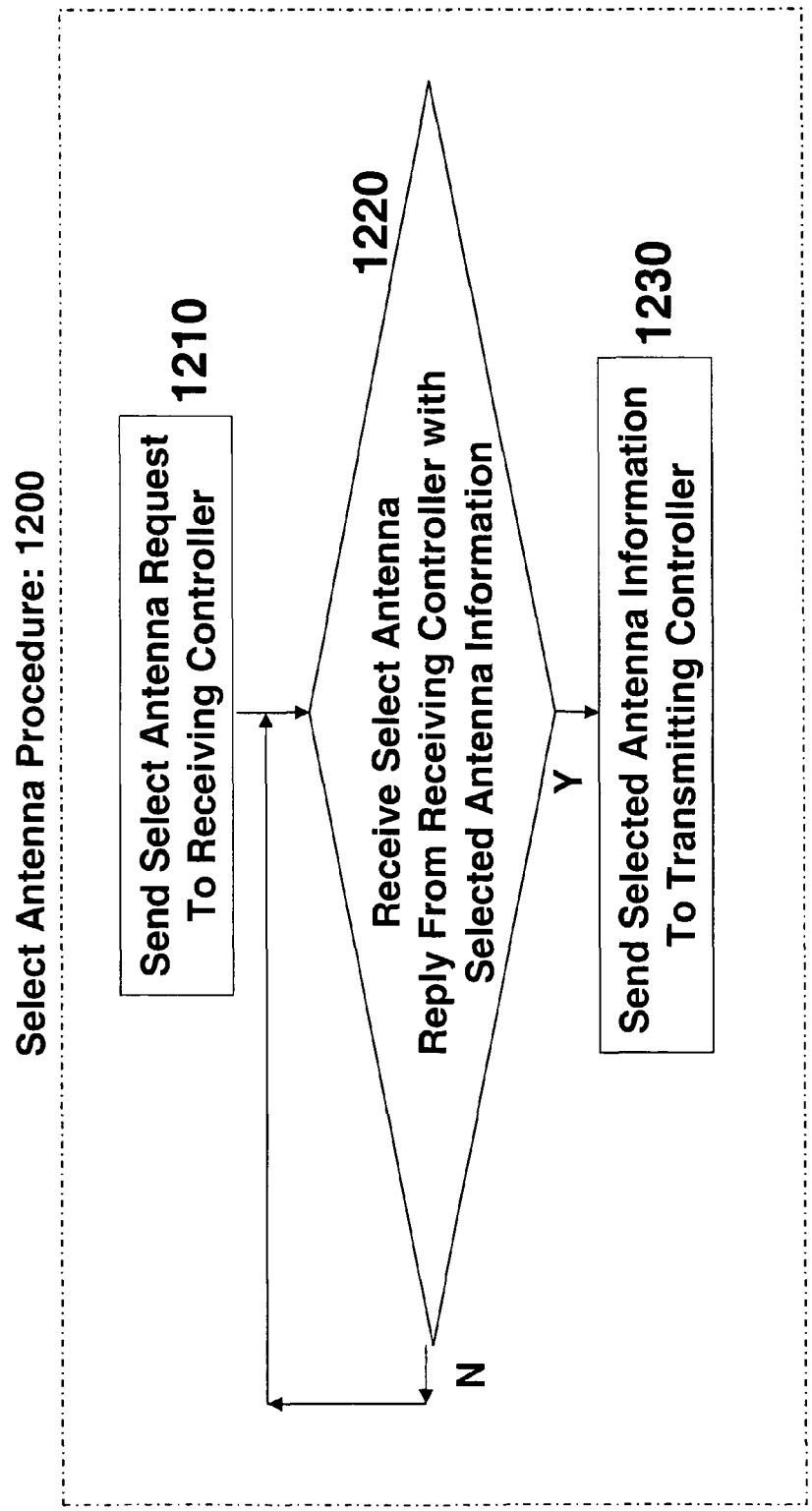

FIG. 12 is a flow chart describing the operation of select antenna procedure in the antenna control unit.

Figure 13:
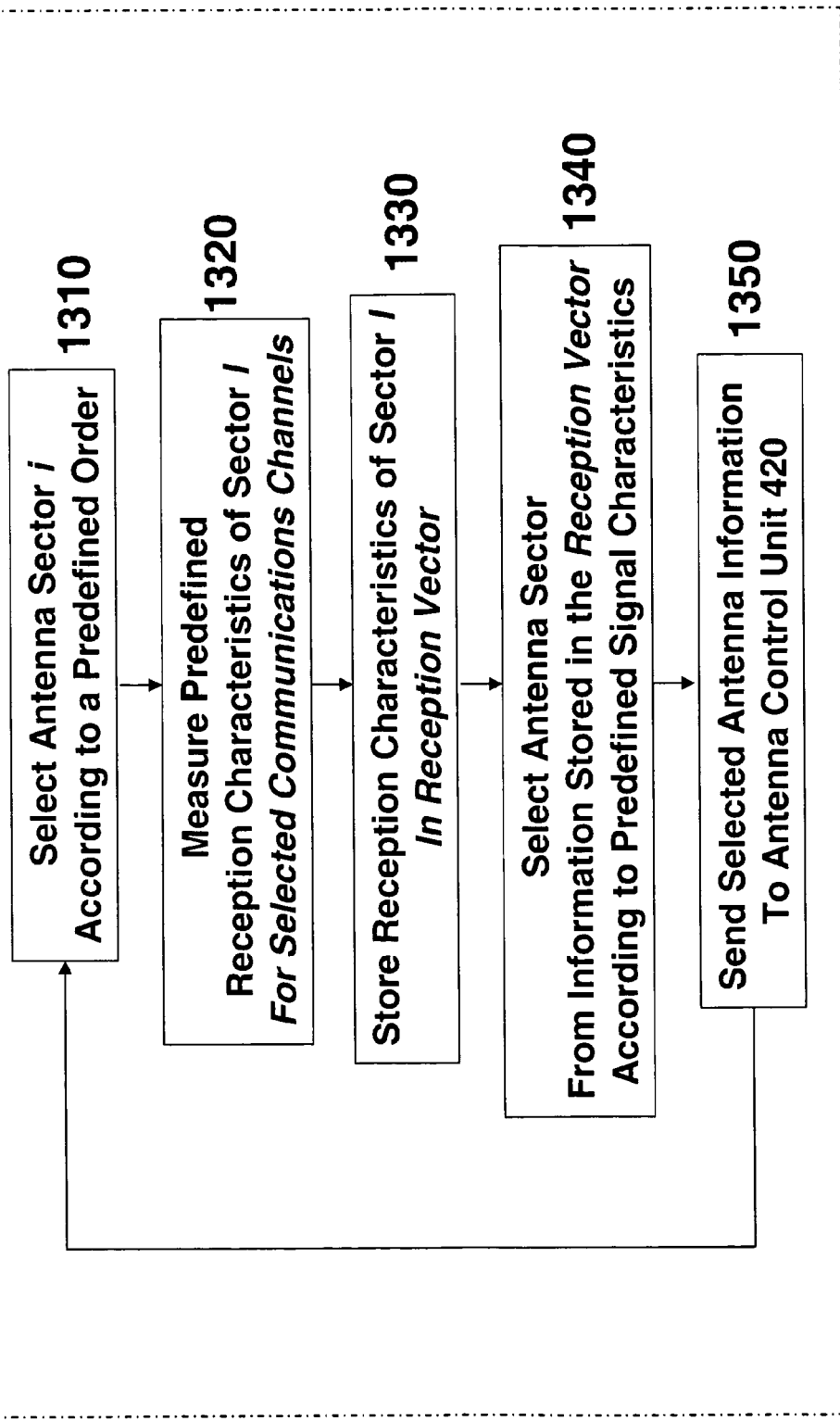

FIG. 13 is a flow chart describing the operation of select antenna algorithm: continuous direction-of-arrival operation of the spatial receiving controller.

Figure 14:
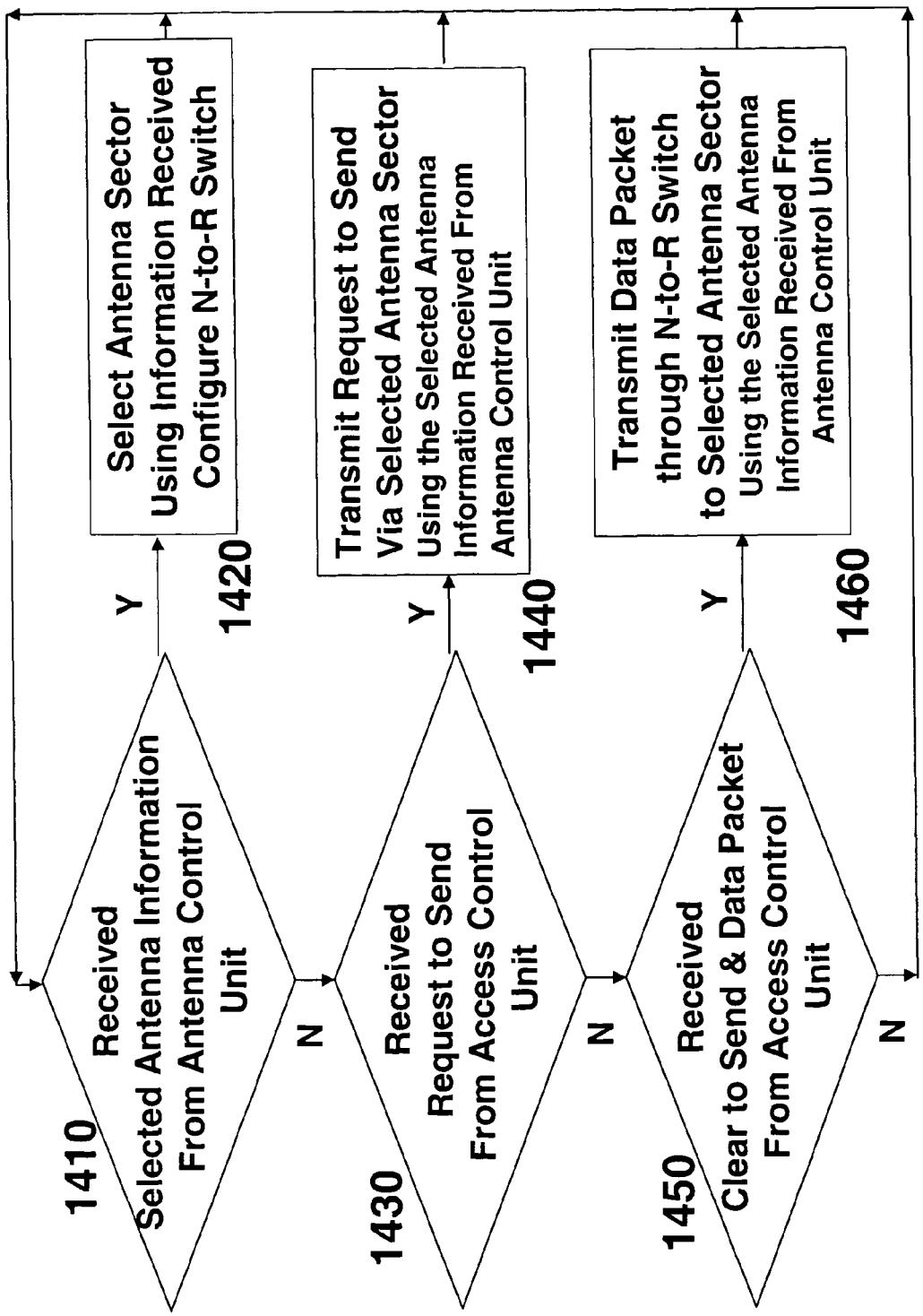

FIG. 14 is a flow chart describing the operation of the spatial transmitting controller.

Figure 15:
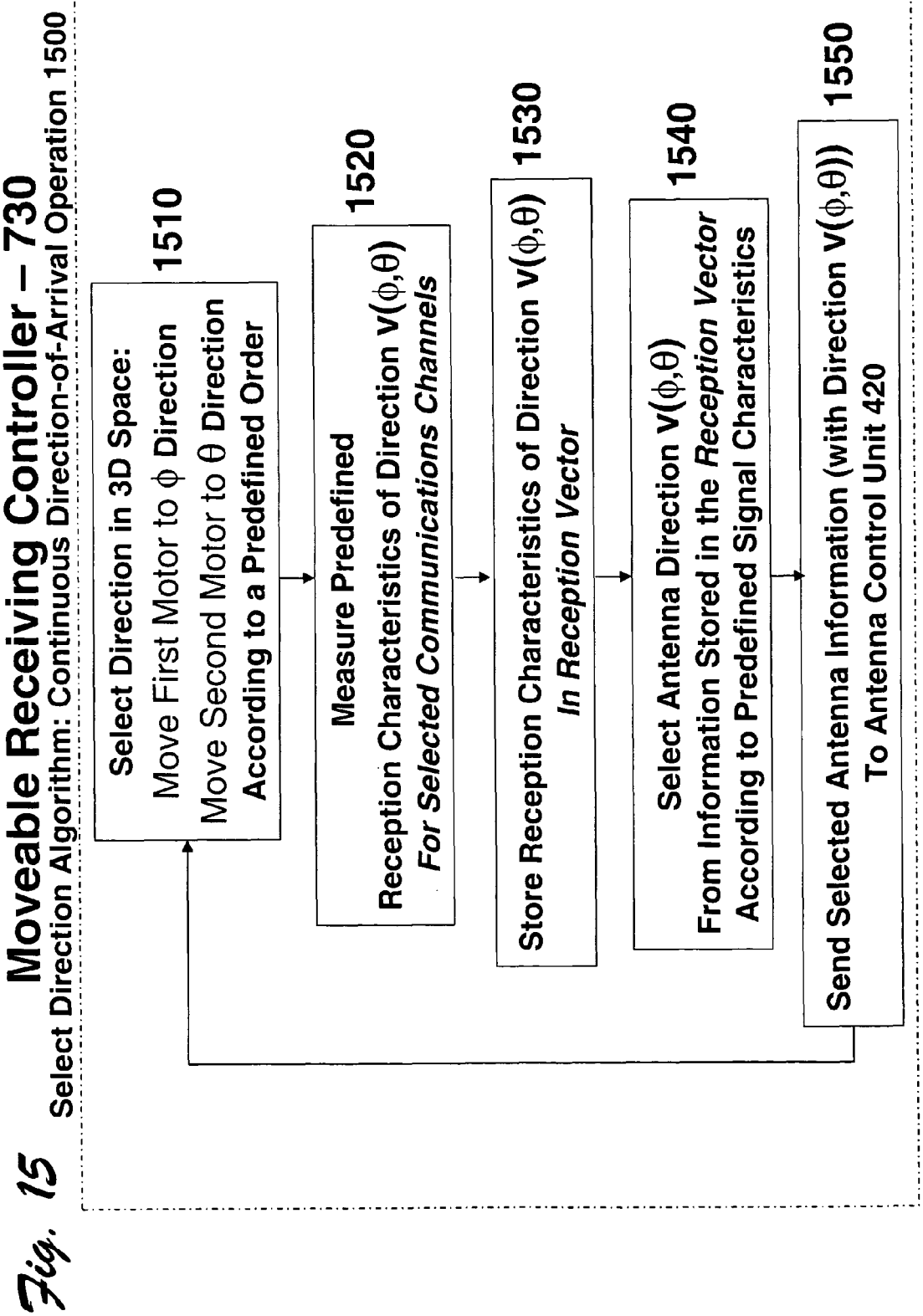

FIG. 15 is a flow chart describing the select direction algorithm: continuous direction-of-arrival operation of the moveable receiving controller.

Figure 16:
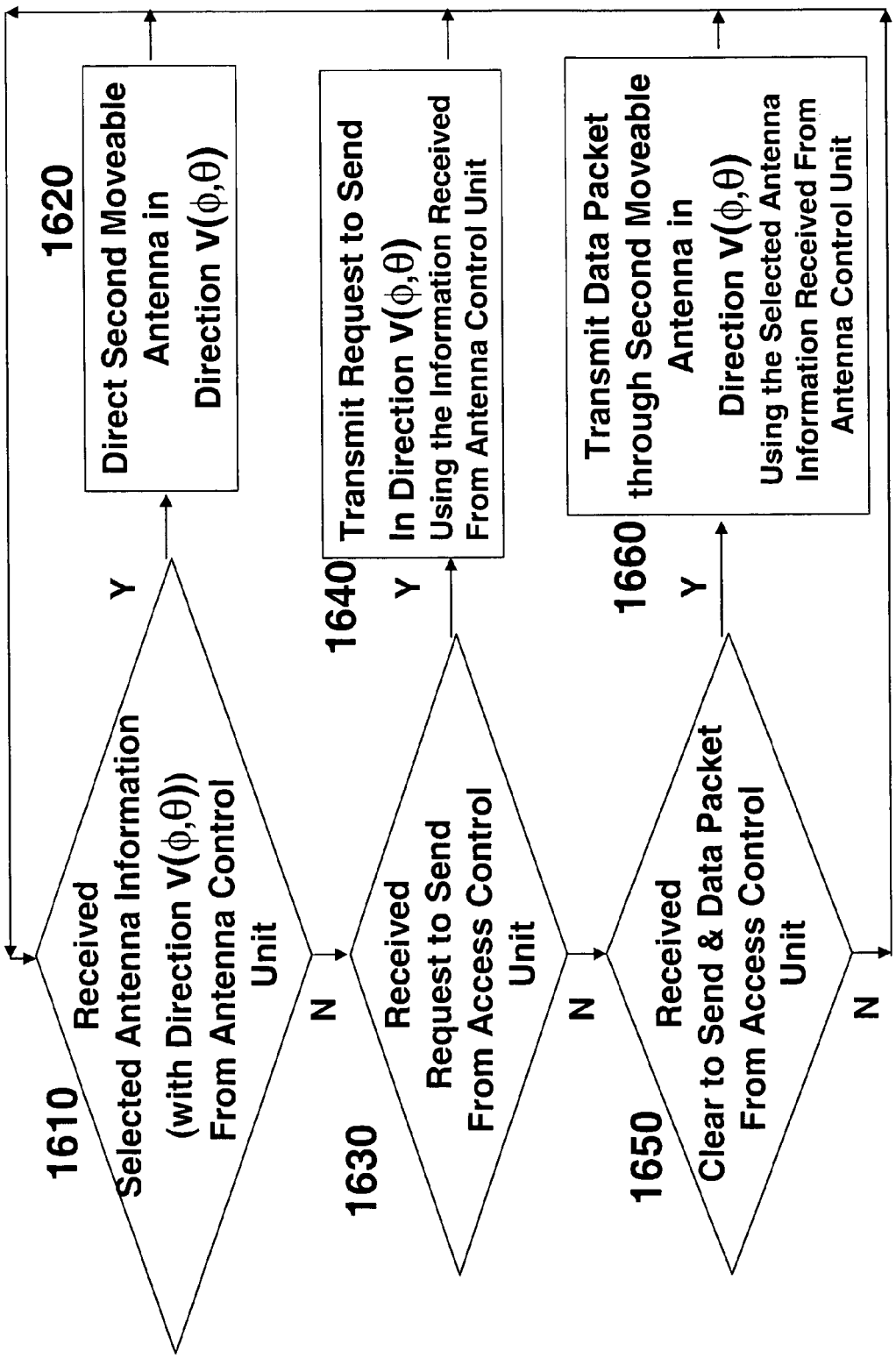

FIG. 16 is a flow chart describing the operation of the moveable transmitting controller.

Figure 17:
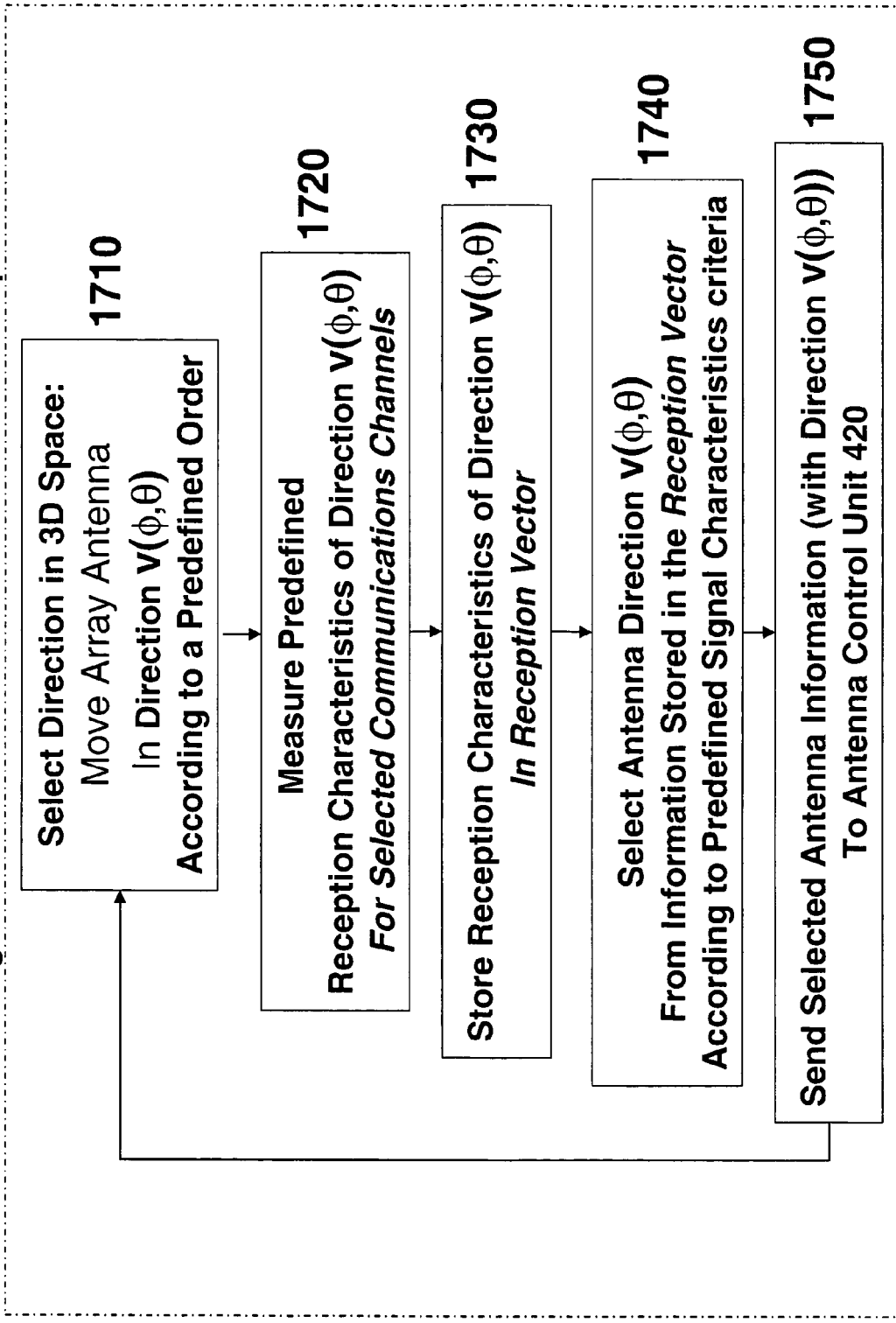

FIG. 17 is a flow chart describing the select direction algorithm: continuous direction-of-arrival operation of the array-receiving controller.

Figure 18:
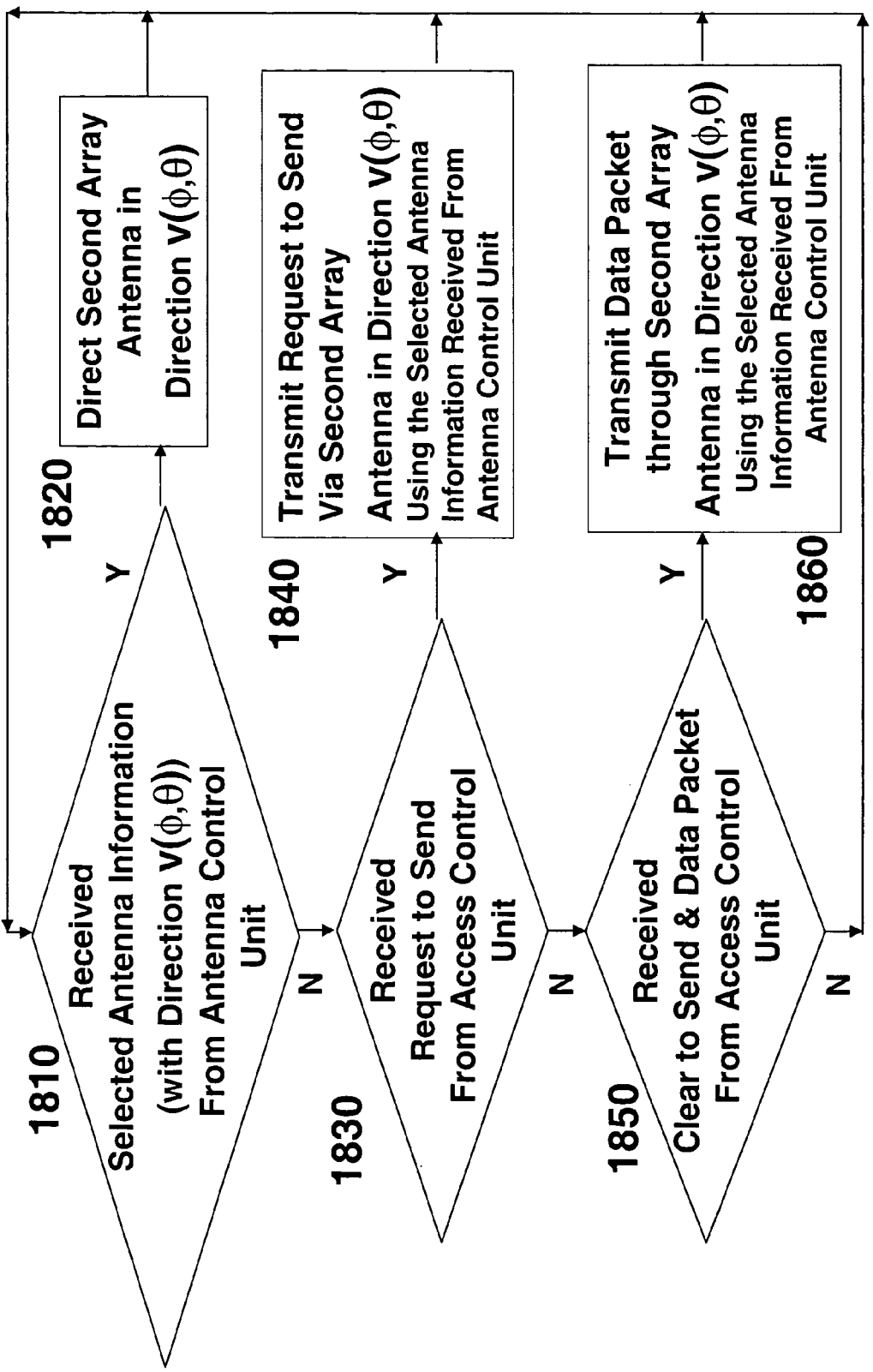

FIG. 18 is a flow chart describing the operation of the array-transmitting controller.

Figure 19:
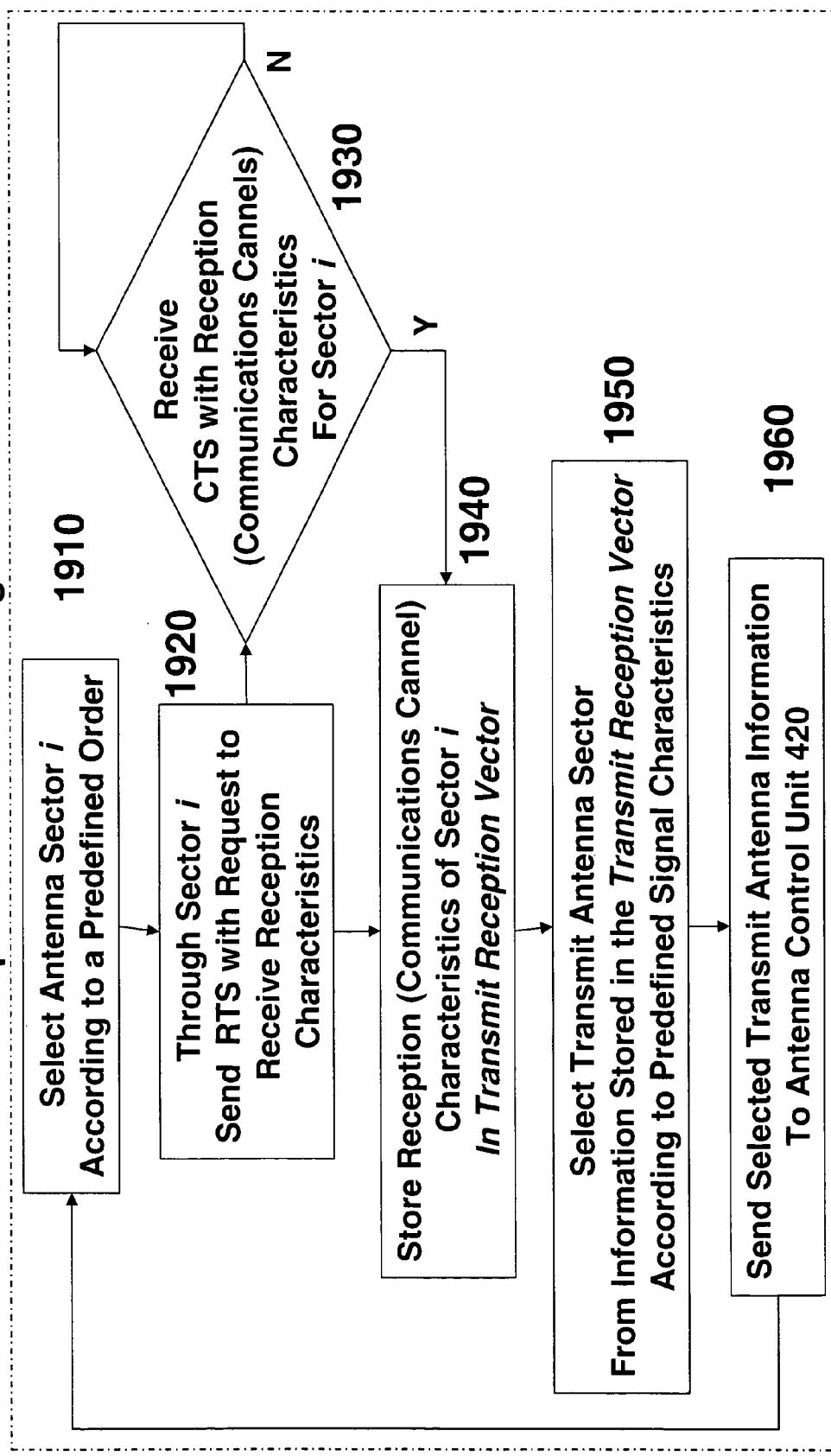

FIG. 19 is a flow chart describing the operation of an end (mobile) device that is capable of transmitting and receiving on different radio frequencies.

Figure 20:
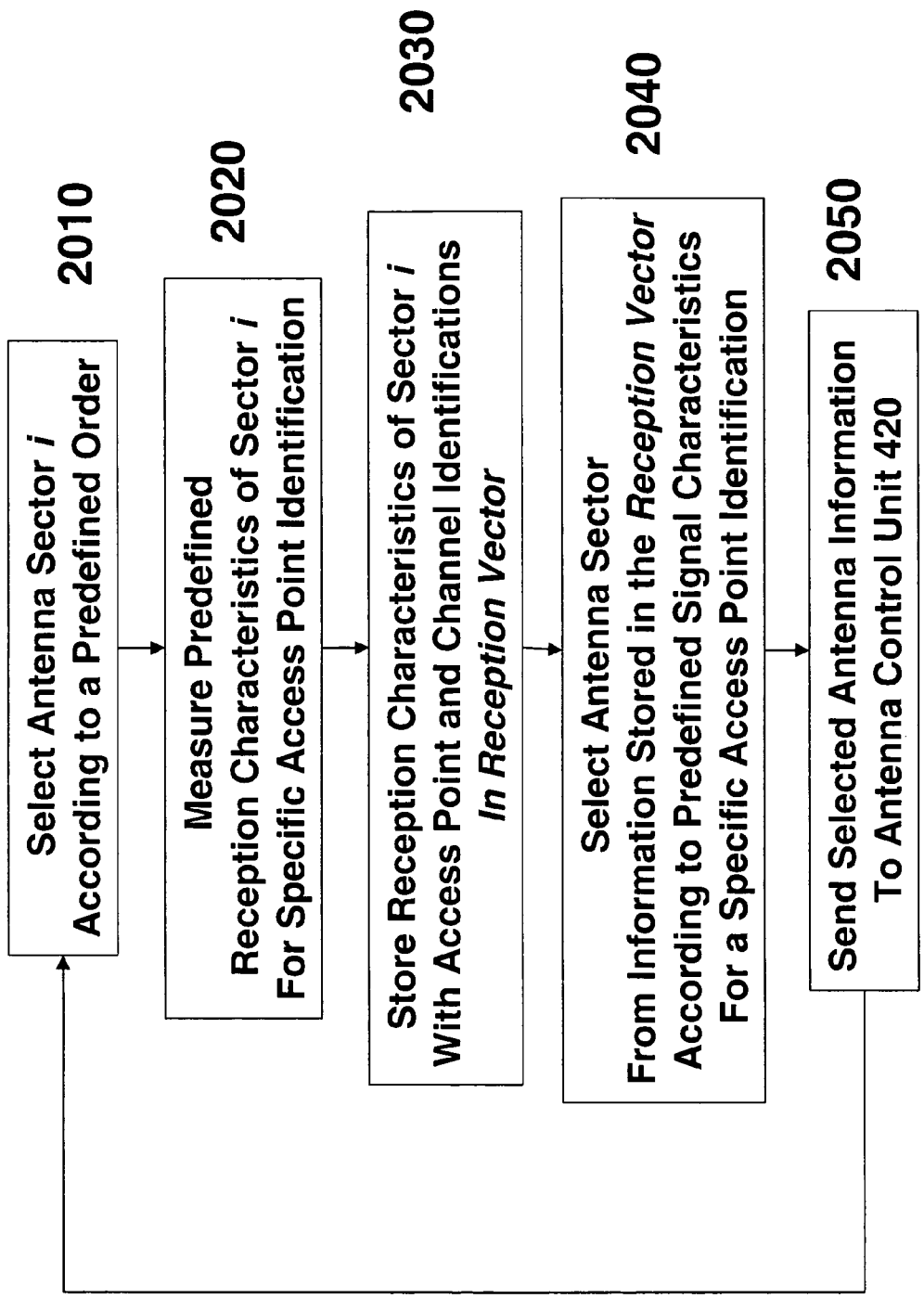

FIG. 20 is a flow chart describing the operation of an end (mobile) device that is capable of selecting and locking its operation to a specific selected access point; while continuously selecting an antenna sector in which the received signal has the most desired properties.

Figure 21:
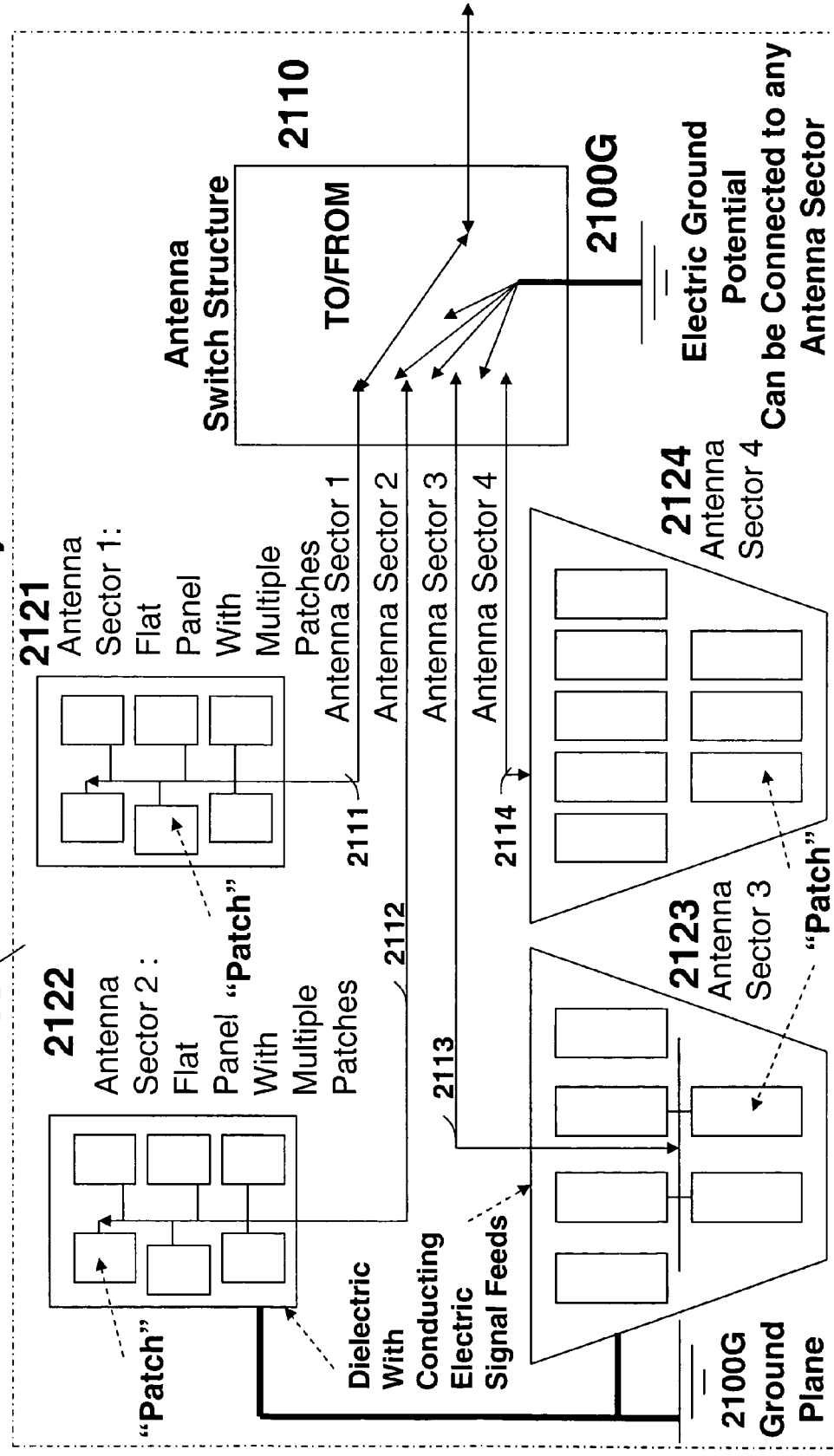

FIG. 21 is a schematic description of an Antenna System 150, which consists of four directional and/or polarized planar array antenna sectors that can be used in the current invention, such that each antenna sector can be a micro-strip phased/patch array or flat panel. The four antenna sectors are selected and controlled by an antenna switch structure.

Figure 22:
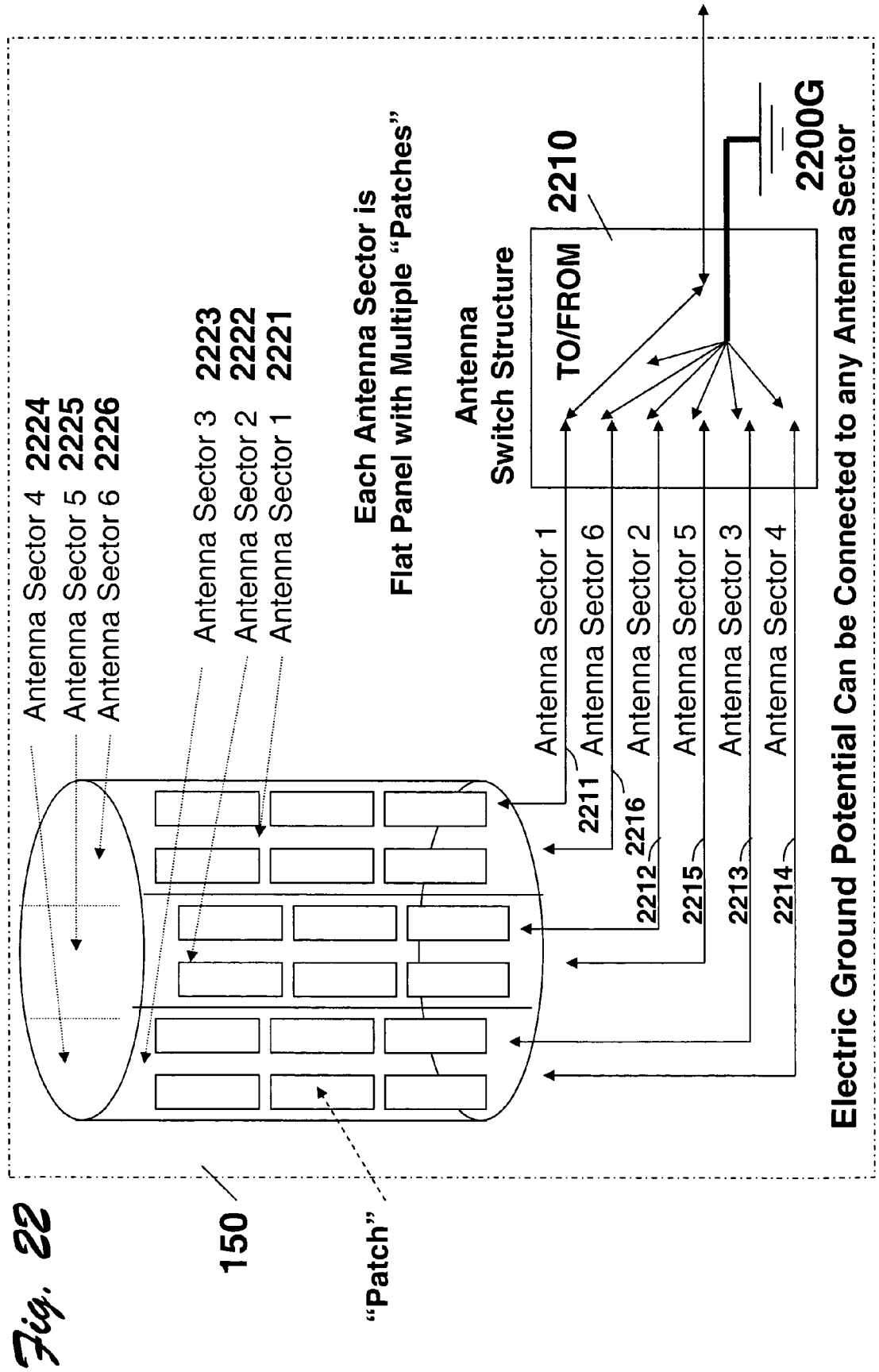

FIG. 22 is a schematic description of an Antenna System 150 which consists of six directional and/or polarized planar array antenna sectors are arranged on a cylinder, such that, each antenna sector can be a micro-strip phased/patch array or flat panel. The six antenna sectors are selected and controlled by an antenna switch structure.

Figure 23:
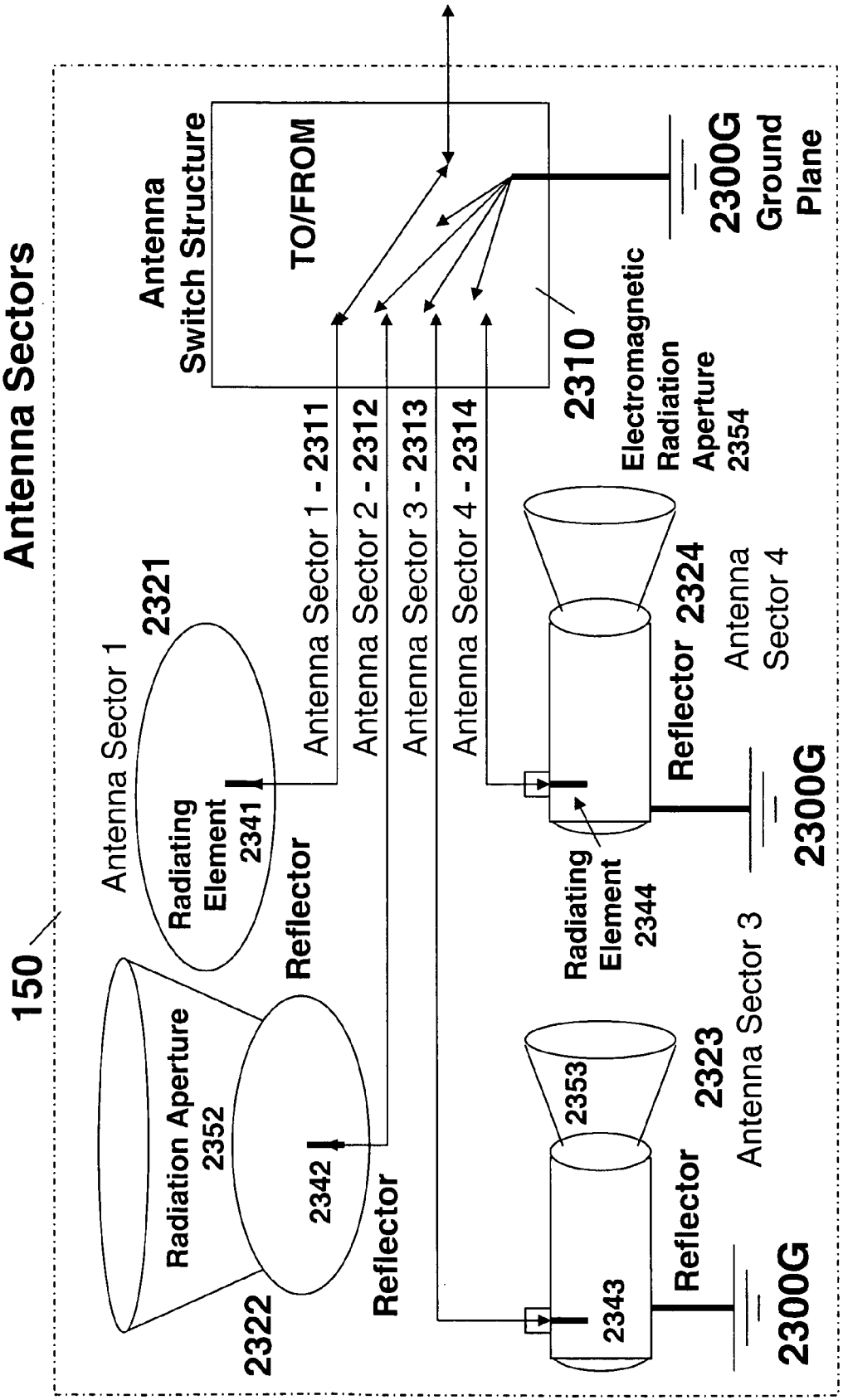

FIG. 23 is a schematic description of an Antenna System 150 which consists of four directional parabolic-dish-reflector and/or Yagi/tube-like antenna sectors that can be used in the current invention. The four antenna sectors are selected and controlled by an antenna switch structure.

Figure 24:
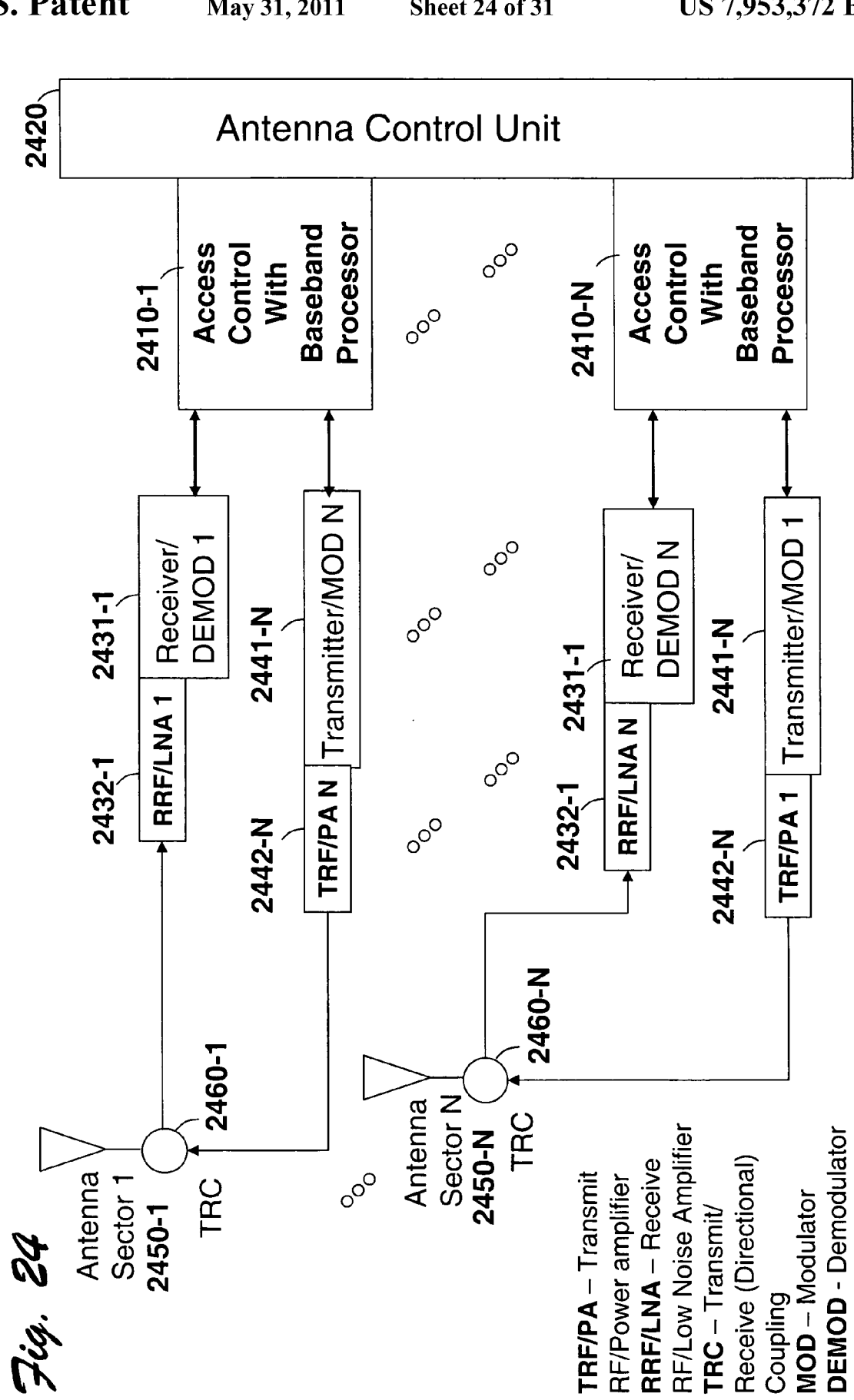

FIG. 24 is a functional description of the mobile device (MD) and the antenna system (AS) that is comprised of N antenna sectors that are coupled to a separate access control unit with baseband processor by means of transmit/receive coupling (TRC), TRF (transmit radio frequency), RRF (receive radio frequency). The plurality of separate access control units with baseband processors are coupled to an antenna control unit. This mobile device configuration does not require a switch for switching among the plurality of antenna sectors.

FIG. 25 is a description of directional flat panel antenna sector design principles as a function of: (1) the flat panel rectangle dimensions L1-length and L2-width, and (2) the wavelength lambda.

FIG. 26 is a functional description of a plurality of vertically stackable flat panel antenna sectors (each antenna sector may be tilted along L1 and/or L2). Each antenna sector directs the transmission of its electromagnetic energy to a defined region in three-dimensional space. The vertically stackable flat panel antennas are placed one on top of the width-side L2 of the other.

FIG. 27 is a functional description of plurality of vertically stackable Yagi, tube-like, directional antenna sectors. Each Yagi antenna sector directs the transmission of its electromagnetic radiation to a defined cone-like region in three-dimensional space. The vertically stackable Yagi antennas are placed one on top of the other.

Figure 28:
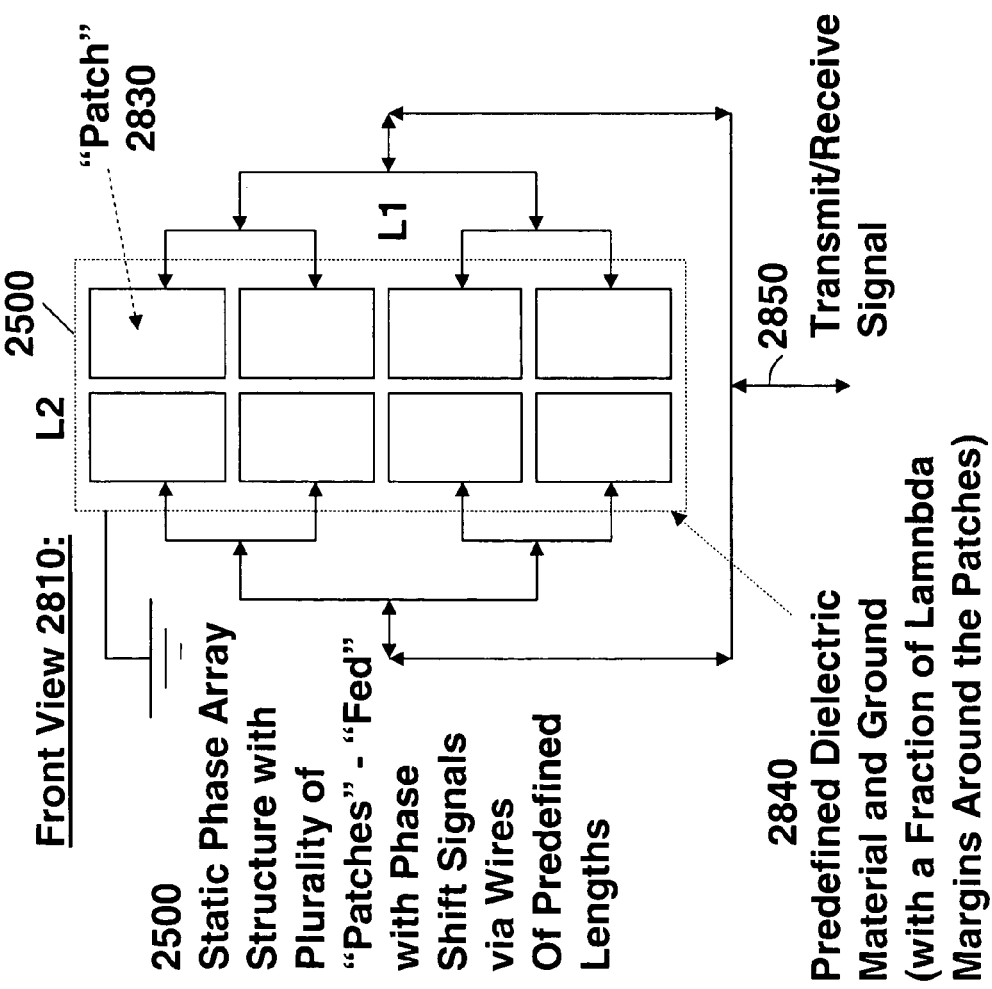

FIG. 28 is a functional description of a flat panel antenna sector with multiple "patches" 2810, with front view 2810 and side view 2820. The "patches" are placed on dielectric material on top of a ground plan 2840 and are fed by an electric signal 2850.

Figure 29:
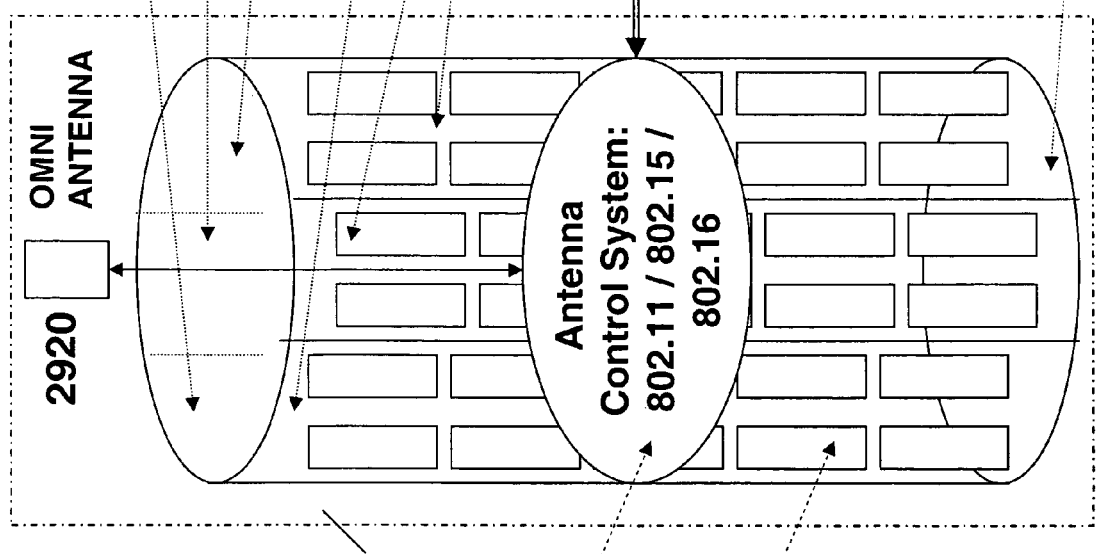

FIG. 29 is a functional description of an antenna system utilizing six flat panel directional antenna sectors that are attached on a cylinder 2900 forming hexagonal structure. The antenna system contains an antenna control system 2930 that is connected to a computing device 2940 via a communications channel 2950.

Figure 30:
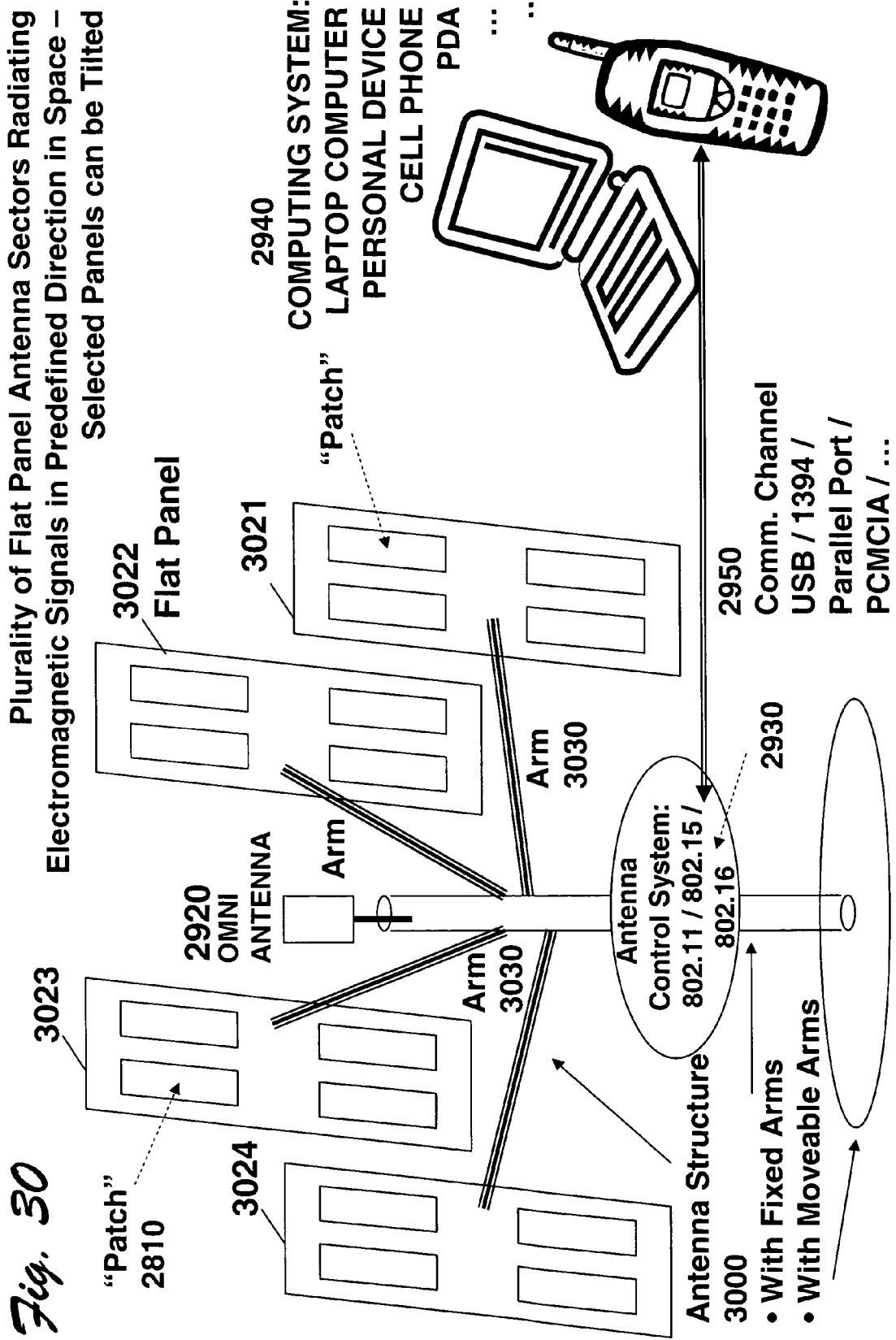

FIG. 30 is a functional description of an antenna system utilizing four flat panel directional antenna sectors that are attached to an antenna structure 3000 with arms. The antenna system contains an antenna control system 2930 that is connected to a computing device 2940 via a communications channel 2950.

Figure 31:
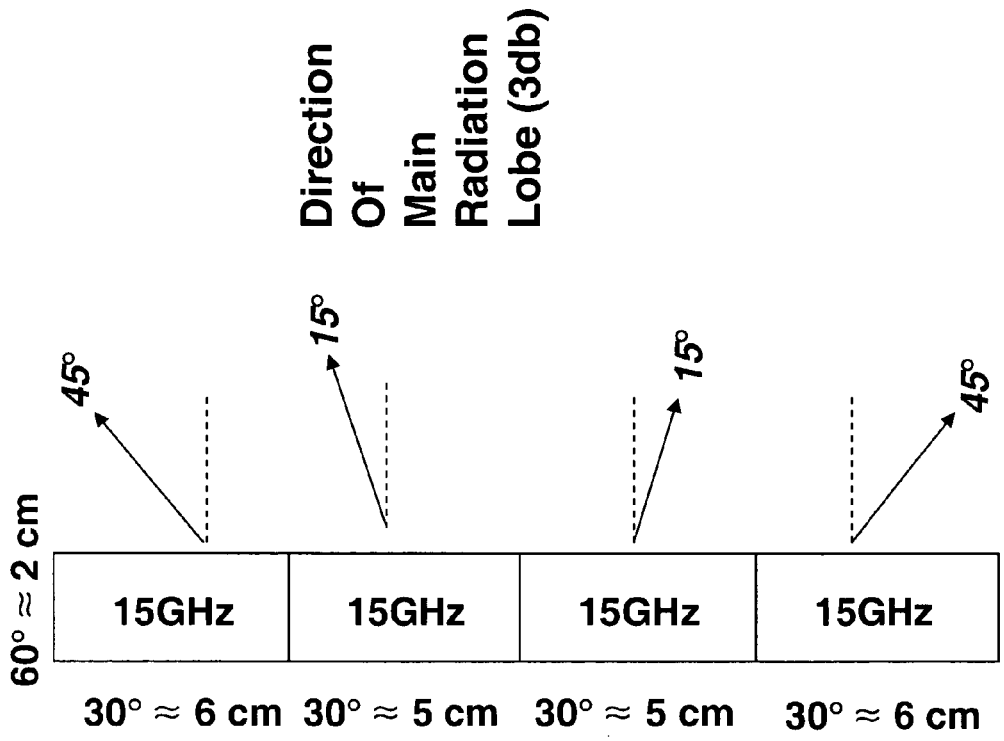

FIG. 31 is a schematic description of a vertical slice of cylindrical structure such that six such vertical slices with hexagonal arrangement are needed for covering 360°. This vertically stackable example provides for quadruple spatial vertical coverage.

DETAILED DESCRIPTION OF THE PREFERRED EMBODIMENT

While this invention is susceptible of embodiment in many different forms, there are shown in the drawings, and will be described herein in detail, specific embodiments thereof with the understanding that the present disclosure is to be considered an exemplification of the principles of the invention and is not intended to limit the invention to the specific embodiments illustrated.

The present invention relates to a method and system for increasing transmission capacity of wireless networks.

General Description

Figure 1:
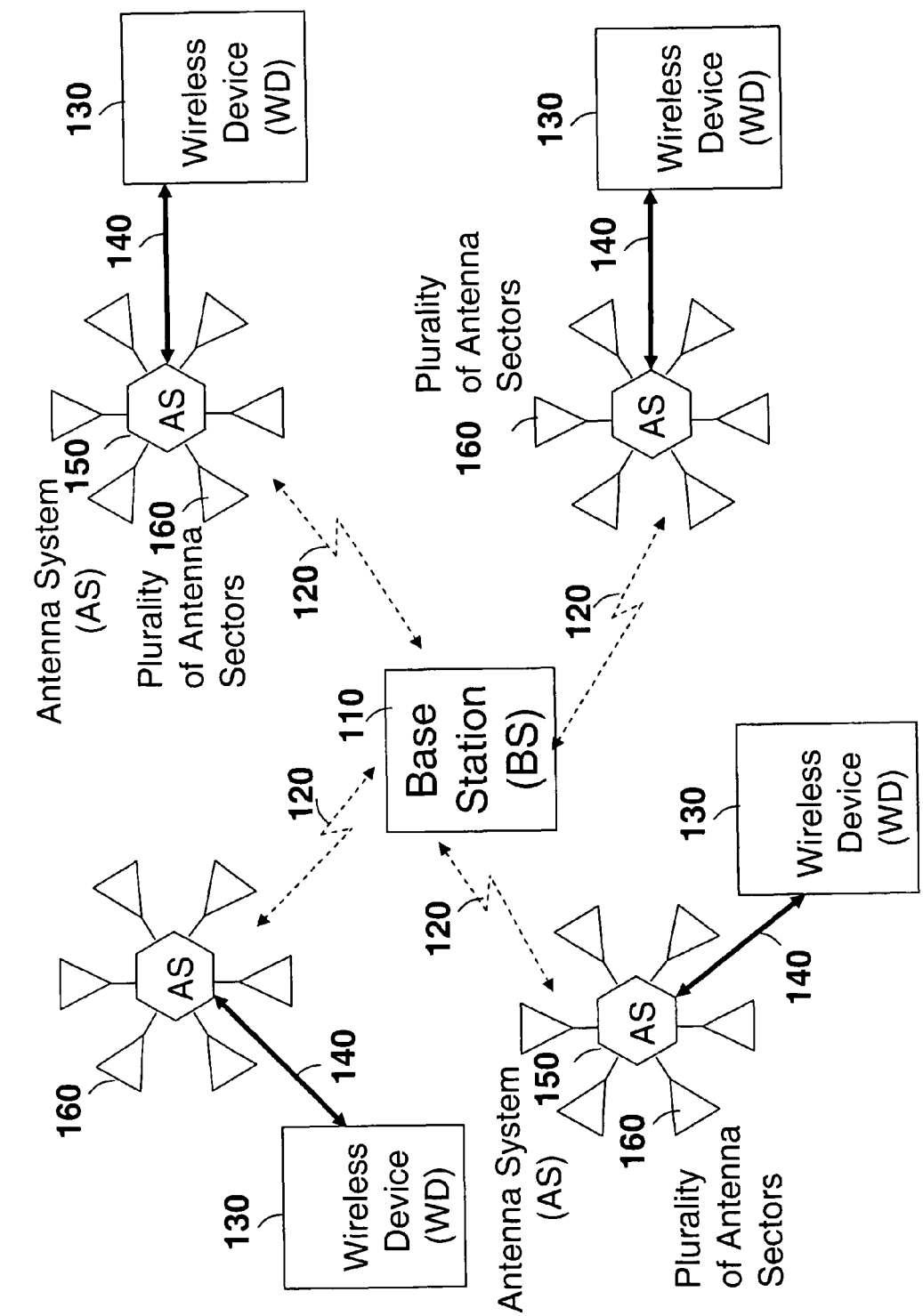
FIG. 1 is a general description of a system comprised of a base station (BS) and a plurality of mobile devices (MDs).

The following are some acronyms used in this preferred embodiment description:

TRC—Transmit/Receive (Directional) Coupling
TRF/PA—Transmit RF (Radio Frequency)/Power Amplifier
RRF/LNA—Receive RF (Radio Frequency)/Low Noise Amplifier
MOD—Modulator
DEMOD—Demodulator
WL—wireless FIG. 1 and FIG. 2 are general descriptions of the present invention. As shown in FIG. 1, the base station (BS) 110 communicates by means of wireless or radio channel 120 with a plurality of wireless devices (WDs) 130 via a plurality of antenna systems (AS) 150. The AS 150 is connected to its respective WD 130 via a link 140—at at least a wireless link or a wired link. Each antenna system 150 consists of a plurality of antenna sectors 160.

An antenna is defined as being an efficient radiator of electromagnetic energy by converting a fluctuated voltage into the electromagnetic wave during transmission, and it converts the electromagnetic wave into voltage during reception. Antennas have five basic properties: bandwidth, directivity, power gain, polarization, and radiation pattern.

The main antenna property that is used in this invention is directivity. Each antenna sector 160 is radiating electromagnetic energy in a predefined direction covering a predefined region of three-dimensional space, as show in FIG. 3. Consequently, there is a plurality of antenna sectors 160 enable radiating electromagnetic energy covering parts or the whole three-dimensional space.

The base station 110 in FIG. 1 consists of at least one antenna that radiates electromagnetic energy in a predefined direction covering a predefined sector of three-dimensional space. A specific case of the base station 110 antenna is an omni antenna that transmits in all directions. In an alternate configuration, the base-station 110 has three antenna sectors covering a predefined sector of three-dimensional space, wherein the predefined sector of three-dimensional space by combining the coverage of the three antenna sectors.

The antenna system 150 selectively activates the antenna sectors 160, in order to have the best the quality of transmission and reception between the wireless device 130 and the base station 110. The wireless device 130 is a mobile device, carried by a person or by other means. In order to improve the wireless system performance, the mobile device will continuously monitor, and change as needed, the antenna sector 160 used for transmission and reception of data packets with the base station 110.

The antenna system 150 in this invention is a novel type of a sectorized (with multiple sectors) antenna system that selectively cover parts of the three-dimensional space by selectively activating fixed antenna beams with heightened sensitivity in particular directions. The antenna system 150 detects signal strength; chooses from one of several predetermined, fixed antenna sectors 160, and switches from one antenna sector to another as the mobile user moves or as a result of changing wireless transmission conditions. The antenna system 150 is shaping the directional antenna pattern with the metallic properties and physical design of a single element. The antenna system 150 will increase gain according to the location of the wireless device 130 with respect to the base station 110, while simultaneously identifying and tracking the base station 110, and minimizing interfering signals from other wireless devices 130 and other base stations 110.

FIG. 2 is another general description of the present invention. As shown in FIG. 2, there is a neighborhood (e.g., hot spot) base station (BS) 110 that is communicating by means of wireless or radio channel 120 with a plurality of residence antenna systems 150 each with a plurality of antenna sectors 160. The residence antenna systems 150 are connected to a plurality of access point routers 230 via a plurality of links 220—at least wireless links or a wired links. The access point routers 230 are functionally equivalent to the base station 110 (FIG. 1). The access point routers 230 are connected to various mobile devices 240 via a shared wireless link, wherein the shared wireless link is at least one of: IEEE 802.11, IEEE 802.15, IEEE 802.16, 3G and 4G.

Specifically, the wireless connection between the neighborhood base station 110 and the plurality of residence antennas 150/160 can be used for fixed wireless, e.g., LMDS (Local Multipoint Distribution Service)—IEEE 802.16. The unique directional properties enable the residence antenna 150/160 to adapt to changing wireless transmission conditions, e.g., solving the need to manually adjust and redirect the fixed antenna due to the changing quality of multi-path wireless transmissions.

The access point router 230 is also equipped with an antenna system 150 with a plurality of antenna sectors 160 (see FIG. 1), and consequently, can adapt to changing wireless transmission conditions, e.g., solving the need to manually adjust and redirect the fixed antenna of the access point router 230 due to the changing quality of multi-path wireless transmissions.

The various mobile devices 240 in FIG. 2 are connected to the neighborhood base station 110 in at least one of the following ways:

Via the access point router 230 to the neighborhood base station 110,
Via the access point router 230 and the residence antenna 150/160 to the neighborhood base station 110,
Via the residence antenna 150/160 to the neighborhood base station 110, and
Directly communicating with the neighborhood base station 110.

The various mobile devices 240 in FIG. 2 are equipped with the antenna system 150 with a plurality of antenna sectors 160. The various mobile devices 240 are at least one of: laptop computer, personal digital assistant, cellular phone, 2.5G cellular phone, 3G wireless device, 4G wireless device, consumer electronic games, multimedia wireless devices, videoconferencing system, wireless packet audio system, wireless packet video system, electronic book and electronic paper.

FIG. 3 is a general possible description and definition of a directional sectorized antenna 160. Such an antenna radiates or receives electromagnetic waves more effectively in some directions rather than others. Directivity of an antenna is defined as the theoretical characteristic of an antenna to concentrate power in only one direction, whether transmitting or receiving. Gain or antenna gain is the practical value of the directivity of an antenna. It takes into account the efficiency of the complete structure. The antenna power gain is defined as the ratio of the antenna's maximum radiation intensity in a certain direction to the maximum radiation intensity of a reference antenna (dipole, isotropic antenna) with identical power applied to both. Relative antenna power gain is defined as the ratio of the average radiation intensity of the test antenna to the average radiation of a reference antenna with all other conditions remaining equal.

The direction of a directional antenna is often defined having (1) azimuth-horizontal direction expressed as the angular distance between the direction of a fixed point (as the observer's heading) and the direction of the object, and (2) elevation—vertical direction expressed as the angular distance between the direction of a fixed point (as the observer's heading) and the vertical direction of the object.

In FIG. 3 the azimuth is defined by the "Phi" 311 angle and the elevation is defined the "Theta" 312 angle. The transmit region 320 of a directional antenna is defined using radian (rad.): A unit of plane angle measure is equal to the angle subtended at the center of a circle by an arc equal in length to the radius of the circle. Radian is the Standard International unit of plane angular measure. There are two "pi", or approximately 6.28318, radians in a complete circle. Thus, one radian is about 57.296 angular degrees. The term radian arises from the fact that the length of a circular arc, corresponding to an angle of one radian, is equal to the radius of the arc. This is shown in the illustration. Point P represents the center of the circle. The angle q, representing one radian, is such that the length of the subtended circular arc is equal to the radius, r, of the circle. The radian is used by mathematicians, physicists and engineers. It arises in natural phenomena and in equations which, unlike the angular degree, were invented for human convenience.

As shown in FIG. 3 the transmit region 320 is covered by a directional or sectorized antenna 160 and can have a rectangular shape or circular shape. In case of a rectangular region for receiving and transmitting 320 it can be defined by azimuth and elevation with radians. In case of a circular region for receiving and transmitting 320 it can be defined using only one measure with radians.

As shown in FIG. 1, FIG. 4 and FIG. 5, the present invention is a system for transmitting a plurality of data packets. The system comprises a wireless device, a plurality of antenna sectors, a receiving controller and a transmitting controller. The receiving controller is selectively coupled to at least one of the antenna sectors in order to measure their received electromagnetic signal characteristics. The receiving controller selects at least one of the antenna sectors within a first predefined time interval prior to the transmission of at least one data packet responsive to their received electromagnetic signal characteristics. The transmitting controller is selectively coupled to at least one of the antenna sectors in order to transmit at least one data packet via the antenna sectors selected by the receiving controller.

As shown in FIG. 2, the wireless device is part of at least one of the following: laptop computer, personal computer, personal digital assistant, cellular phone, 2.5G cellular phone, 3G device, 4G device, consumer electronic games, multimedia devices, videoconferencing system, wireless packet audio system, wireless packet video system, electronic book, home entertainment system, electronic paper, GPS (global positioning system) receiver, automotive, boats, ships, airplanes, trains, satellites, hand-held devices, base stations, wireless access points, access routers, electronic scanners, UAV (unmanned aerial vehicle), and packet switch.

As shown in FIG. 2, the wireless device is mounted on at least one of: automotive, boats, ships, airplanes, trains, satellites, hand-held devices, laptop computers, base stations, access routers, packet switch outputs.

As shown in FIG. 3, selected ones of the antenna sectors are directional antennas, which transmit electromagnetic signals in defined directions covering predefined regions or parts of a three-dimensional space. More specifically, each directional antenna sector transmits in a direction defined using circular three-dimensional coordinates Phi and Theta; wherein each directional antenna transmission covers a respective defined region in three-dimensional space at a respective defined distance in the direction defined with Phi and Theta in circular three-dimensional coordinates. The respective defined region of the transmissions emitted by the directional antennas overlaps a defined part of the three-dimensional space.

802.11 MAC Layer and Collision Avoidance in 802.11

One of the preferred embodiments of the present invention involves the media access control (MAC) of 802.11 wireless local area network (LAN) standard. The Media Access Control layer specification for 802.11 has similarities to the 802.3 Ethernet wired line standard. The protocol for 802.11 uses a protocol scheme knows as carrier-sense, multiple-access, collision avoidance (CSMA/CA). This protocol avoids collisions instead of detecting a collision like the algorithm used in 802.3. It is difficult to detect collisions in an RF transmission network, and it is for this reason that collision avoidance is used. The MAC layer operates together with the physical layer by sampling the transmitted energy over the medium transmitting data. The physical layer uses a clear channel assessment (CCA) algorithm to determine if the channel is clear. This is accomplished by measuring the RF energy at the antenna and determining the strength of the received signal. This measured signal is commonly known as RSSI (Received Signal Strength Indicator). If the received signal strength is below a specified threshold the channel is declared clear and the MAC layer is given the clear channel status for data transmission. If the RF energy is above the threshold, data transmissions are deferred in accordance with the protocol rules. The standard provides another option for CCA that can be alone or with the RSSI measurement.

Carrier sense can be used to determine if a channel is available. This technique is more selective sense, since it verifies that the signal is the same carrier type as 802.11 transmitters. The best method to use depends upon the levels of interference in the operating environment. The CSMA/CA protocol allows for options that can minimize collisions by using request to send (RTS), clear-to-send (CTS), data and acknowledge (ACK) transmission frames, in a sequential fashion. Communications are established when one of the wireless nodes sends a short message RTS frame. The RTS frame includes the destination and the length of message. The message duration is known as the network allocation vector (NAV). The NAV alerts all others in the medium, to back off for the duration of the transmission.

The receiving station issues a CTS frame, which echoes the sender's address and the NAV. If the CTS frame is not received, it is assumed that a collision occurred and the RTS process re-starts. After the data frame is received, an ACK frame is sent back verifying a successful data transmission.

A common limitation with wireless LAN systems is the "hidden node" problem. This can disrupt 40% or more of the communications in a highly loaded LAN environment. It occurs when there is a station in a service set that cannot detect the transmission of another station; thus, cannot detect that the media is busy. As an example, given stations A, B, and C stations: A and C can communicate; likewise, B and C can communicate. However, an obstruction prevents station B from directly receiving station A; thus, B cannot determine when the channel is busy. Therefore, both stations A and B could try to transmit at the same time to station C. The use of RTS, CTS, Data and ACK sequences helps to prevent the disruptions caused by this problem.

IEEE 802.11a devices use a different radio technology from 802.11b and operate in the 5 GHz bands. IEEE 802.11a therefore is a supplement to the basic IEEE 802.11 standard. Although the IEEE 802.11a standard operates in a different unlicensed radio band, it shares the same proven Medium Access Controller (MAC) protocol as Wi-Fi. In more technical terms, IEEE 802.11a standardizes a different physical layer (PHY). Since products conforming to the IEEE 802.11a standard will operate in different radio bands, they will not be interoperable with Wi-Fi radios, which follow the 802.11b-recommendation.

IEEE 802.11b contains some further definitions of the physical layer, and provides for interoperability of Wi-Fi WLAN products. Wi-Fi products operate in the worldwide 2.4 GHz Industry, Science and Medicine (ISM) band.

IEEE 802.11g uses OFDM (Orthogonal Frequency Division Multiplexing) which is a compulsory part of IEEE 802.11g and provides for transmission speeds up to 54 Mbit/sec. It would be compatible with WiFi. It also supports CCK (Complementary Code Keying) in order to be compatible with existing radio units that adhere to EEE 802.11b. The CCK transmission mode, also used by WiFi, uses one single carrier, while OFDM is a new technique, just entering the WLAN-market. It can be used at both 2.4 and 5 GHz carrier frequencies.

Description of the Wireless Network Adapters in the Current Invention

Four wireless network adapters are described:

In FIG. 4 with N antenna sectors 450, R receivers 431, and RRF/LNA 432 (Receive RF (Radio Frequency)/Low Noise Amplifier) between the R receivers 431 and the N-to-R switch 433. Specific operation details are in FIG. 11, FIG. 12, FIG. 13 and FIG. 14.

In FIG. 5 with N antenna sectors 450, R receivers 431, and RRF/LNA 432 (Receive RF (Radio Frequency)/Low Noise Amplifier) between the N antenna sectors 450 and the N-to-R switch 433. Specific operation details are in FIG. 11, FIG. 12, FIG. 13 and FIG. 14.

In FIG. 7 with two moveable antennas 750. With specific operation details in FIG. 8, FIG. 15 and FIG. 16.

In FIG. 9 and FIG. 10 with array antennas. With specific operation details in FIG. 17 and FIG. 18.

FIG. 4 is one system configuration in accordance with the present invention. The system is comprised of four control units:

Access control unit 410—for realizing the media access control protocol as specified in FIG. 11

Antenna control unit 420—for coordinating the selection operation among the multiple antenna sectors 450-1 to 450-N as specified in FIG. 12

Spatial receiving controller 430—for realizing the receiving operation as specified in FIG. 13

Spatial transmitting controller 440—for realizing the transmitting operation as specified in FIG. 14

The access control unit 410 controls the operation of data packet sending by executing the procedure 1100 in FIG. 11, which operates as follows:

When there is a data packet that needs to be transmitted (or sent) over the wireless channel the access control unit 410, the access control unit 410 sends a request to send (RTS) signal 1110 (in FIG. 11) to the spatial transmitting controller 440.

The access control unit 410 then waits until it receives clear to send (RTS) signal 1120 from the spatial receiving controller 430.

The access control unit 410 sends Clear to Send (CTS) with the data packet to transmitting controller 440—1130. In which case the message to the transmitting controller 440 may include a transmission schedule at the time the data should be transmitted.

In another embodiment of the current invention, the access control unit 410 controls the operation of data packet sending by following the various IEEE 802.11 standards, e.g., IEEE 802.11a, IEEE 802.11b and IEEE 802.11g.

The antenna control unit 420 has a baseband processor—422, controls the operation of Select Antenna Procedure 1200 by executing the procedure specified in FIG. 12, which operates as follows:

The antenna control unit 420 Sends Select Antenna Request to Receiving Controller—1210—thenThe antenna control unit 420 Receives Select Antenna Reply From Receiving Controller with Selected Antenna Information—1220—then The antenna control unit 420 Sends Selected Antenna Information to Transmitting Controller—1230.

The antenna control unit 420 also includes a First Buffer 421 for storing selected parameters: electromagnetic signal characteristics for the signal for selected ones of the antenna sectors, selected parts of the digital data received by the spatial receiving controller 430 and by selected ones from the plurality of Receiver/DEMODs (demodulators) 431. The operation of the plurality of Receiver/DEMODs (demodulators) 431 is controlled by the spatial receiving controller 430. The plurality of Receiver/DEMODs (demodulators) 431 is coupled to the plurality of RRF/LNAs (Receive RF/Low Noise Amplifiers) 432 for receiving the analog signal through the N-to-R Switch 433 and the plurality of TRCs (Transmit/Receive (Directional) Couplings) 460 from the plurality of antenna sectors 450.

The spatial receiving controller 430 operates continuously, as described in FIG. 13, performing the Selecting Antenna Algorithm: Continuous Direction-of-Arrival Operation 1300 in five steps:

Step 1310—Select Antenna Sector i—According to a Predefined Order

Step 1320—Measure Predefined Reception Characteristics of Sector i—which includes RFDC/RFID (Radio Frequency Data Communications/Radio Frequency Identification), RSSI (Received Signal Strength Indicator) that provides a signal for logic circuit processing that is a function of received RF signal strength. RSSI is used both by the access control unit 410 and the antenna control unit 420. Step 1330—Store Reception Characteristics of Sector i In Reception VectorStep 1340—Select Antenna Sector From Information Stored in the Reception Vector According to Predefined Signal Characteristics Step 1350—Send Selected Antenna Information To Antenna Control Unit Then back to Step 1310.

The antenna control unit 420 has a baseband processor 422, and controls the operation of the Spatial Transmitting Controller 440. The Spatial Transmitting Controller 440 controls the operation of the transmitter modulator 441 and the T-to-N switch 443 in order to send data packets in the selected direction, by executing the procedure specified in FIG. 14. The operation of the Spatial Transmitting Controller 440 has three continuous decision steps:

Decision Step 1—1410: Received Selected Antenna Information From Antenna Control Unit? If NO THEN GOTO Decision Step 2—1430, ELSE Select Antenna Sector Using Information Received Configure N-to-R Switch 1420.

Decision Step 2—1430: Received Request to Send From Access Control Unit? If NO THEN GOTO Decision Step 3—1450, ELSE Transmit Request to Send Via Selected Antenna Sector Using the Selected Antenna Information Received From Antenna Control Unit 1440.

Decision Step 3—1450: Received Clear to Send & Data Packet From Access Control Unit? If NO THEN GOTO Decision Step 1—1410, ELSE Transmit Data Packet through N-to-R Switch to Selected Antenna Sector Using the Selected Antenna Information Received From Antenna Control Unit 1460.

FIG. 5 is a functional description of the mobile device (MD) 130 and the antenna system (AS) 150 that is comprised of N antenna sectors 450 that are coupled to an antenna control unit by means of switches 433 and 433, transmit/receive coupling (TRC) 460, TRF (transmit radio frequency), RRF (receive radio frequency), receivers and transmitters. Specifically, in this functional description, the TRFs are located to couple the T-to-N switch 443 to the TRCs and the RRFs are located to couple the TRCs to the N-to-R switch 433.

The wireless network adapter that is described in FIG. 5 is similar to the wireless network adapter that is described in FIG. 4. However, in FIG. 5 the plurality of Receiver/DEMODs (demodulators) 431 are coupled to the N-to-R Switch 433, which is coupled to the plurality of RRF/LNAs (Receive RF/Low Noise Amplifiers) 432 for receiving the analog signal through and the plurality of TRCs (Transmit/Receive (Directional) Couplings) 460 from the plurality of antenna sectors 450. While in the wireless network adapter that is described in FIG. 4, the plurality of RRF/LNAs (Receive RF/Low Noise Amplifiers) 432 are located between the N-to-R Switch 433 and the plurality of Receiver/DEMODs (demodulators) 431. On the transmit side of the wireless network adapter that is described in FIG. 5, the TRF/PA (Transmit RF (Radio Frequency)/Power Amplifier) 442 is coupled the T-to-N switch 443 and to the plurality of antenna sectors 450 through the plurality of TRC (Transmit/Receive (Directional) Coupling) 460. While in the wireless network adapter that is described in FIG. 4, the plurality of the TRF/PAs (Transmit RF (Radio Frequency)/Power Amplifiers) 442 is coupled the T-to-N switch 443 and to the plurality of transmitter/MODs (modulators) 442.

FIG. 7 is a system configuration of an antenna system, wireless network adapter, comprised of two moveable antenna systems. FIG. 8 is a diagram of a moveable antenna system that can be directed in 3-D space by means of two motors. FIG. 15 is a flow chart describing the select direction algorithm: continuous direction-of-arrival operation of the moveable receiving controller. FIG. 16 is a flow chart describing the operation of the moveable transmitting controller.

The operation of the access control unit 410 in FIG. 7 is described in the flow chart of FIG. 11—Send Data Packet Procedure: 1100.

When there is a data packet that needs to be transmitted (or sent) over the wireless channel, the access control unit 410 sends a request to send (RTS) signal 1110 (in FIG. 11) to the spatial transmitting controller 440.

The access control unit 410 then waits until it receives clear to send (RTS) signal 1120 from the spatial receiving controller 430.

The access control unit 410 sends Clear to Send (CTS) with the data packet to transmitting controller 440—1130. The message and to the transmitting controller 440 may include a transmission schedule on the time the data should be transmitted.

The operation of the antenna control unit 420 in FIG. 7 is described in the flow chart of FIG. 12—Select Antenna Procedure: 1200.

The antenna control unit 420 sends Select Antenna Request to Receiving Controller—1210—then The antenna control unit 420 receives Select Antenna Reply From Receiving Controller with Selected Antenna Information—1220—then The antenna control unit 420 sends Selected Antenna Information to Transmitting Controller—1230.

The moveable operation of the antenna system in FIG. 7 consists of two controllers:

Moveable Receiving Controller 730 and is further specified in FIG. 15, and Moveable Transmitting Controller 740 and is further specified in FIG. 16.T*he* receiving operation of the moveable operation of the antenna system of FIG. 7 as shown in FIG. 15—Select Direction Algorithm—consists of five computing steps: Continuous Direction-of-Arrival Operation 1500:

Step 1510—Select Direction in 3-D Space: Move First Motor to Phi Direction Move Second Motor to Theta Direction According to a Predefined Order Step 1520—Measure Predefined Reception Characteristics of Direction v(Phi, Theta)

Step 1530—Store Reception Characteristics of Direction v(Phi, Theta) In Reception Vector Step 1540—Select Antenna Direction v(Phi, Theta) From Information Stored in the Reception Vector According to Predefined Signal Characteristics Step 1550—Send Selected Antenna Information (with Direction v(Phi, Theta)) To Antenna Control Unit GOTO Step 1510.

The operation of the Moveable Transmitting Controller 740 in FIG. 16 has three continuous decision steps:

Decision Step 1—1610: Received Selected Antenna Information with Direction v(Phi, Theta) From Antenna Control Unit? If NO THEN GOTO Decision Step 2—1630, ELSE Direct Second Moveable Antenna in Direction v(Phi, Theta) 1620.

Decision Step 2—1630: Received Request to Send From Access Control Unit? If NO THEN GOTO Decision Step 3—1650, ELSE Transmit Request to Send in Direction v(Phi, Theta) that was provided by the Antenna Control Unit 1640.

Decision Step 3—1650: Received Clear to Send & Data Packet From Access Control Unit? If NO THEN GOTO Decision Step 1—1610, ELSE Transmit Data Packet through Second Moveable Antenna in Direction v(Phi, Theta) Using the Selected Antenna Information Received From Antenna Control Unit 1660.

The Access Control Unit 410 in FIG. 7 operates as described in FIG. 11. The Antenna Control Unit 420 in FIG. 7 operates as described in FIG. 12.

The system in FIG. 7 consists of two RRFILNA-A/D (Receiver Radio Frequency/Low Noise Amplifier—Analog to Digital Conversion) & Direction of Arrival (DoA) Receiver 731-1 and 731-2. The first RRF/LNA-A/D 731-1 is connected to the first Moveable Antenna System (AS) 750-1 and is used to continuously scan a predefined part of the three-dimensional space and record the quality of the analog and digital signals that are received in various directions in said predefined part of the three-dimensional space. The recorded quality of the analog and digital signals is then transferred to the Antenna Control Unit 420. The operation of the first Moveable Antenna System (AS) 750-1 and the first RRF/LNA-A/D 731-1 is performed by the Moveable Receiving Controller 730, which performs three basic functions:

Directs the first Moveable Antenna System (AS) 750-1 in predefined set of direction in the predefined part of the three-dimensional space using the first Motion Control Signal 770-1, Controls the recording quality of the analog and digital signals in the predefined set of direction in the predefined part of the three-dimensional space by the first RRF/LNA-A/D 731-1, which receives the RF (radio frequency) signal 780-1 from the first Moveable Antenna System (AS) 750-1, and Controls the receiving operations of data packets by the second RRF/LNA-A/D 731-2, which receives the RF (radio frequency) signal from the second Moveable Antenna System (AS) 750-2 and then transfers the data packet to the Access Control Unit 410.

The second Moveable Antenna System (AS) 750-2 in FIG. 7 is connected to both the second RRF/LNA-A/D 731-2 and TRF/PA-D/A (Transmit RF/Power amplifier—digital-to-analog conversion) Transmitter 740 by means of the TRC (Transmit/Receive (Directional) Coupling) 760. The second Moveable Antenna System (AS) 750-2 is controlled by the second Motion Control Signal 770-1 received from the Antenna Control Unit 420. The operation of the TRF/PA-D/A (Transmit RF/Power amplifier—digital-to-analog conversion) Transmitter 740 is controlled by the Moveable Transmitting Controller, which receives data packets for transmission the selected direction v(Phi, Theta) from the Access Control Unit 410—as described in 1660 in FIG. 16.T*he* operation of Antenna Systems (ASs) 750-1 and 750-2 are described in more detail in FIG. 8. Each of the two Antenna Systems (ASs) 750-1 and 750-2 is a 3-D Moveable Antenna System that is controlled by two Moveable Directions: Motion Control Signal in Two Circular Coordinates: v(Phi, Theta), which are controlled by two signals:

Move to Theta Direction Signal 820-H—horizontal motion, and

Move to Phi Direction Signal 820-V—vertical motion.

The Antenna Systems (ASs) 750-1 and 750-2 motion can be realized by various means such as electric step-motor. As shown in FIG. 8., there are two step motors: step-motor 1 810-H is controlled by Direction Signal 820-H, and step-motor 2 810-V is controlled by Direction Signal 820-V.

As shown in FIG. 7 and FIG. 8, selected ones of the antenna sectors are electro-mechanically steered antennas. The electro-mechanically steered antennas cover a predefined range in at least one of: two dimensional space and three-dimensional space, as defined in FIG. 3. The electro-mechanically steered antennas are moveable by at least one of: a step-motor, an electric motor, an electric field, and a magnetic field.

FIG. 9 is a wireless network adapter configuration of an antenna system that is comprised of a plurality of antenna sectors—each comprising a plurality of antenna elements. FIG. 17 is a flow chart describing the select direction algorithm: continuous direction-of-arrival operation of the array-receiving controller. FIG. 18 is a flow chart describing the operation of the array-transmitting controller. The general operation principles of the adapter in FIG. 9 are similar to the wireless network adapter in FIG. 4 FIG. 5. The wireless network adapter in FIG. 9 consists of N Antenna Sectors, 950-1 to 950-N, with k Antenna Elements each. The k Antenna Elements are used to form a beam in specific direction in the 3-D space. The beam forming of each antenna sector is done responsive to plurality of circuits for synthesizing the pattern of k antenna elements' digital beam forming (DBF) that is part of:

- Array & RRF/LNA (Receive RF/Low Noise Amplifier) & Receiver 931-1 to 931-R
- Array & TRF/PA (Transmit RF/Power amplifier) & Transmitter 941-1 to 941-T
- Array & RRF/LNA are coupled to: (1) the N Antenna Sectors, 950-1 to 950-N, through an N-to-R Switch 933, (2) the Array Receiving Controller 930, (3) the Antenna Control Unit 420 (see FIG. 12) for receiving direction information, and (4) the Access Control Unit 410 (see FIG. 11) for transferring data packets received from the wireless channel.
- Array & TRF/PA are coupled to: (1) the N Antenna Sectors, 950-1 to 950-N, through an N-to-T Switch 943, (2) the Array Transmitting Controller 940, (3) the Antenna Control Unit 420 (see FIG. 12) for receiving direction information, and (4) the Access Control Unit 410 (see FIG. 11) for receiving data packets to be transmitted over the wireless channel.

The wireless network adapter in FIG. 9 further consists of two controllers: (1) Array Receiving Controller 930—see FIG. 17 and (2) Array Transmitting Controller 940—see FIG. 18. The two controllers are responsible for the actual operations required for receiving and transmitting data packets. The two controllers are described next.

The Array Receiving Controller in FIG. 9 as shown in FIG. 17—Select Direction Algorithm consists of five computing steps: Continuous Direction-of-Arrival Operation 1700:

- Step 1710—Select Direction in 3-D Space: Move Array Antenna in Direction v(Phi, Theta) According to a Predefined Order
- Step 1720—Measure Predefined Reception Characteristics of Direction v(Phi, Theta)
- Step 1730—Store Reception Characteristics of Direction v(Phi, Theta) In Reception Vector
- Step 1740—Select Antenna Direction v(Phi, Theta) From Information Stored in the Reception Vector According to Predefined Signal Criteria
- Step 1750—Send Selected Antenna Information (with Direction v(Phi, Theta)) To Antenna Control Unit GOTO Step 1710.

The operation of the Array Transmitting Controller 940 in FIG. 18 has three continuous decision steps:

- Decision Step 1—1810: Received Selected Antenna Information with Direction v(Phi, Theta) From Antenna Control Unit? If NO THEN GOTO Decision Step 2—1830, ELSE Direct Second Array Antenna in Direction v(Phi, Theta) 1820.
- Decision Step 2—1830: Received Request to Send From Access Control Unit? If NO THEN GOTO Decision Step 3—1850, ELSE Transmit Request to Send in Direction v(Phi, Theta) that was provided by the Antenna Control Unit 1640.
- Decision Step 3—1850: Received Clear to Send & Data Packet From Access Control Unit? If NO THEN GOTO Decision Step 1—1810, ELSE Transmit Data Packet through Second Array Antenna in Direction v(Phi, Theta) Using the Selected Antenna Information Received From Antenna Control Unit 1860.

FIG. 10 is a wireless network adapter configuration of an antenna system that is a variation of the wireless network adapter configuration of an antenna system in FIG. 9. The system in FIG. 10 comprises three antenna segments in the x, y and z directions—each is comprised of k antenna elements.

The system in FIG. 10 includes an Array Receiving Controller that operates according to FIG. 17 which is a flow chart describing the select direction algorithm: continuous direction-of-arrival operation of the array receiving controller. The system in FIG. 10 includes an Array Transmitting Controller that operates according to FIG. 18 which is a flow chart describing the operation of the array transmitting controller.

As shown in FIG. 10, this configuration of wireless network adapter consists of three Antenna Sectors—each with k Antenna Elements. Each sector is has a direction in 3-D space: (1) X direction—1010-x, (1) Y direction—1010-y, and (1) Z direction—1010-x. Each of the three sectors is coupled to a corresponding module that consists of: RF (radio frequency) with D/A (digital-to-analog conversion)—A/D (analog-to-digital conversion)—1020-x, 1020-y and 1020-z. The three RF with D/A-A/D modules are coupled to and controlled by both the Array Transmitting Controller 940 and the Array Receiving Controller 930. The Array Transmitting Controller 940 and the Array Receiving Controller 930 are coupled to and control the operation of both Array Transmitter 941 and Array Receiver 931. Both Array Transmitter 941 and Array Receiver 931 are coupled to the three antenna sectors: 1020-x, 1020-y and 1020-z, for transmitting and receiving digital data units.

As shown in FIG. 9 and FIG. 10, selected ones of the antenna sectors are array antennas. Each selected one of the array antennas direct its electromagnetic signal in a direction defined using circular three-dimensional coordinates Phi and Theta (as shown in FIG. 3). The respective defined region of the transmissions emitted by the array antennas overlaps a defined part of the three-dimensional space.

Special Operation Modes

Two special operation modes are described herein:

1. In FIG. 19, for end (mobile) device transmitting and receiving on different radio frequencies, FIG. 19 is a flow chart describing the operation of an end (mobile) device that is capable of transmitting and receiving on different wavelengths, and
2. In FIG. 20, for end (mobile) device locking on a specific access point, FIG. 20 is a flow chart describing the operation of an end (mobile) device that is capable of selecting and locking its operation to a specific selected access point, while continuously selecting an antenna sector in which the received signal has the most desired properties.

In some cases, it is necessary to transmit and receive using two different radio frequencies; consequently, the transmit and receive operations are not symmetric. Specifically, the transmit and receive operations may have to use different antenna sectors—e.g., see the wireless network adapters in FIG. 4 and FIG. 5. With different transmit and receive frequencies the following observations can be made regarding the two operations:

1. Receive operation—determining the best receiving antenna sector can be done as described in FIG. 4, FIG. 5, FIG. 11, FIG. 12, FIG. 13, and FIG. 14.
2. Transmit operation—determining the best transmitting antenna sector can be done by getting feedback from the receiver on the other side, which is usually the access point (AP).

The transmit operation in the case of different transmit and receive frequencies is described in FIG. 19 and has the following six steps:

Step 1: 1910—Select Antenna Sector i According to a Predefined Order

Step 2: 1920—Through Sector i Send RTS (request to send) message with Request to Receive Reception Characteristics to the receiving side,-typically the access point.

Step 3: 1930—Wait until Receive CTS (clear to send) message with Reception Characteristics for Sector i from the receiving side-typically the access point.

Step 4: 1940—Store Reception Characteristics of Sector i In Transmit Reception Vector Step 5: 1950—Select Transmit Antenna Sector From Information Stored in the Transmit Reception Vector According to Predefined Signal Characteristics; consequently, the transmit antenna sector (as described in FIG. 4 and FIG. 5) is continuously updated Step 6: 1960—Send Selected Transmit Antenna Information To Antenna Control Unit 420

GOTO Step 1.

FIG. 20 describes the procedure by which the end (mobile) device locks on a specific access point. This configuration may be needed for traffic engineering when there is a plurality of access points and a large number of mobile devices, in an attempt to balance the load on the plurality of access points. The operation in this case is similar to the operation of the wireless network adapters described in FIG. 4, FIG. 5 and FIG. 13 (Select Antenna Algorithm: Continuous Direction-of-Arrival Operation 1300). Selecting the antenna sector that performs best with respect to a specific access point is performed in the following five iterative steps:

Step 1: 2010—Select Antenna Sector i According to a Predefined Order.

Step 2: 2020—Measure Predefined Reception Characteristics of Sector i For Specific Access Point Identification.

Step 3: 2030—Store Reception Characteristics of Sector i with Access Point Identification In Reception Vector.

Step 4: 2040—Select Antenna Sector from Information Stored in the Reception Vector According to Predefined Signal Characteristics for a Specific Access Point Identification.

Step 5: 2050—Send Selected Antenna Information to Antenna Control Unit 420.

GOTO Step 1.

As shown in FIG. 4, FIG. 5, FIG. 7 and FIG. 9, the system is also comprised of a receiving switch. The receiving controller is selectively coupled to at least one of the antenna sectors by means of the receiving switch. The system is also comprised of a plurality of receiver radio frequencies (RRF). The receiving switch has N inputs and R outputs. The N inputs are selectively connected to the antenna sectors, and R outputs are connected to selected ones of the plurality of the RRF.

As shown in FIG. 4, FIG. 5, FIG. 7 and FIG. 9, the system is also comprised of a transmitting switch. The transmitting controller is selectively coupled to at least one of the antenna sectors by means of the transmitting switch. The system also comprised a plurality of receiver radio frequencies (RRF). The receiving switch has T inputs and N outputs. The N outputs are selectively connected to the antenna sectors, and T inputs are connected to selected ones of the plurality of the RRF.

As shown in FIG. 4, FIG. 5, FIG. 7 and FIG. 9, the receiving controller is selectively coupled to the antenna sectors in a predefined order. The receiving controller is also shown selectively coupled to the antenna sectors in a random order.

As shown in FIG. 4, FIG. 5, FIG. 7 and FIG. 9, the receiving controller is selectively coupled to the antenna sectors in at least one of the following patterns: reoccurring, one at a time, two at a time, three at a time, bisection, opposite directions, intersecting sets.

As shown in FIG. 4, FIG. 5, FIG. 7 and FIG. 9, the received electromagnetic signal characteristics are converted to digital signals with control information and data information used by the receiving controller to select at least one of the antenna sectors.

As shown in FIG. 1, FIG. 4, FIG. 5, FIG. 7, and FIG. 9, the preferred embodiment is a system for transmitting a plurality of data packets comprising: a first buffer; a plurality of antenna sectors; a receiving controller; a transmitting controller. The receiving controller is selectively coupled to at least one of the antenna sectors in order to measure their received electromagnetic signal characteristics and then stores them in the first buffer. The transmitting controller is coupled, based upon the received electromagnetic signal characteristics stored in the first buffer, to at least one of the antenna sectors within a first predefined time interval prior to the transmission of at least one data packet. At least one of the receiving controller and the transmitting controller selects at least one of the antenna sectors based on the received electromagnetic signal characteristics stored in the first buffer.

As shown in FIG. 1, FIG. 4, FIG. 5, FIG. 7, and FIG. 9, the receiving controller is selectively coupled to the antenna sectors in a defined order responsive to the electromagnetic signal characteristics stored in the first buffer, and is selectively coupled to the antenna sectors in at least one of the following patterns responsive to the electromagnetic signal characteristics stored in the first buffer: one at a time, two at a time, three at a time, bisection, opposite directions, intersecting sets.

FIG. 1, FIG. 4, FIG. 5, FIG. 7, and FIG. 9, show a wireless device and an antenna system coupled to one another by means of at least one of the following: plurality of coax cables, multi-lead coax cable, parallel data connection, serial data connection, parallel data and control connection, parallel data, timing and control connection, PCMCIA interface, USB, IEEE 1394 (Fire-Wire).

FIG. 1, FIG. 4, FIG. 5, FIG. 7, and FIG. 9 show that the wireless device contains at least one of: the plurality of antenna sectors, the receiving controller; the transmitting controller and the first buffer.

FIG. 1, FIG. 4, FIG. 5, FIG. 7, and FIG. 9, show that the antenna system contains at least one of: the plurality of antenna sectors, the receiving controller; the transmitting controller and the first buffer.

FIG. 1, FIG. 4, FIG. 5, FIG. 7, and FIG. 9, show an access control unit that is part of at least one of: the wireless device and the antenna system.

FIG. 1, FIG. 4, FIG. 5, FIG. 7, and FIG. 9, show an antenna control unit that is part of at least one of: the wireless device and the antenna system.

FIG. 1, FIG. 4, FIG. 5, FIG. 7, and FIG. 9, show an antenna selector processor that processes the received electromagnetic signal characteristics stored in the first buffer to select at least one of the antenna sectors for transmission of data packets. The antenna selector processor also performs parts of at least one of the following protocols: IEEE 802.11, IEEE 802.15, IEEE 802.16, CDMA 2000, WCDMA, UMTS, GPRS, 2.5G, 3G, 4G, 5G, GSM.

FIG. 1, FIG. 4, FIG. 5, FIG. 7, and FIG. 9, show the system further comprised of an antenna control unit which sends a request to send (RTS) signal to the transmitting controller and receives a clear to send (CTS) from the receiving controller. The RTS signal is generated responsive to the arrival of at least one data packets.

FIG. 1, FIG. 4, FIG. 5, FIG. 7, and FIG. 9, show the system further comprised of an access control unit, which sends a request to send (RTS) signal to the transmitting controller and wherein the access control unit which receives a clear to send (CTS) from the receiving controller. The RTS signal is generated responsive to the arrival of at least one data packets.

Description of Antenna System 150 Structures with Plurality of Antenna Sectors 160

The antenna system 150 structures are described in: FIG. 6, FIG. 21, FIG. 22, FIG. 23, FIG. 26, FIG. 27, FIG. 29 and FIG. 30.

FIG. 6 is a three-dimensional diagram of an antenna system with a plurality of antenna sectors. A cylindrical configuration 610 is illustrated with six antenna sectors forming a hexagonal structure. The 620 structure is a configuration with six antenna sectors. The 630 structure is a configuration with eight-antenna sectors. The 640 structure is a polyhedron configuration with twelve antenna sectors.

As shown in FIG. 6, the directional antennas are arranged in a predefined pattern in at least one of: octahedron, pentagon, cube, pyramid, sectorized cylinder, polyhedron, Pentagondodecahedron. The predefined pattern orients the directional antennas on selected sides of at least one of: mobile device, communicating device, base station, access point, pole, cellular phones, laptop computer, PDA, WLL system.

The Antenna System (AS)—150 in FIG. 6 consists of a Spatial Receiving Controller; Spatial Transmitting Controller; a Receiver Radio Frequency—RRF; a Transmitter Radio Frequency—TRF; a N-to-R Switch and a T-to-N Switch (see also FIG. 4 and FIG. 5).

Each side of face of the four polygons in FIG. 6 represent a possible antenna sector 620 has six faces on a cylinder forming hexagonal structure, and thus, it can accommodate six possible antenna sectors. 620 has six faces on a cube, and thus, it can accommodate six possible antenna sectors. 630 has eight faces on an octahedron, and thus, it can accommodate eight possible antenna sectors. 640 has twelve faces on a sphere, and thus, it can accommodate twelve possible antenna sectors.

FIG. 21 is a schematic description of a planar array in which all of the elements, both active and parasitic, are in one plane. A Planar antenna can be implemented using printed circuit process, and thus, is often called a printed antenna or antenna's "patches."

Printed circuit antennas are important to telecommunications because of advantages such as low cost, light weight, low profile and the potential for integration with active solid-state devices. For the past decade, there have been significant contributions to printed circuit antenna technology, and specific progress has been made in printed circuit antenna technology; particularly, in the areas of bandwidth enhancement and MMIC phased-array antenna development. The objective has been to develop low-cost, high-efficiency printed circuit antennas through experimentation and analysis. Micro-strip antennas are typically constructed on a printed circuit board (PCB).

An antenna is a device that is made to efficiently radiate and receive radiated electromagnetic waves. There are several important antenna characteristics that should be considered when choosing an antenna for application: Antenna radiation patterns, Power Gain, Directivity, and Polarization.

Power Gain: The power gain of an antenna is a ratio of the power input to the antenna to the power output from the antenna. This gain is most often referred to with the units of dBi, which is logarithmic gain relative to an isotropic antenna. An isotropic antenna has a perfect spherical radiation pattern and a linear gain of one.

Directivity: The directive gain of an antenna is a measure of the concentration of the radiated power in a particular direction. It may be regarded as the ability of the antenna to direct radiated power in a given direction. It is usually a ratio of radiation intensity in a given direction to the average radiation intensity.

Polarization: Polarization is the orientation of electromagnetic waves far from the source. There are several types of polarization that apply to antennas. They are Linear—Vertical, Horizontal and Oblique; and circular—Circular Right Hand (RHCP); Circular Left Hand (LHCP), Elliptical Right Hand and Elliptical Left Hand. Polarization is most important for maximizing performance from the antennas. Optimal performance requires proper polarization matching of the transmitting antenna and the receiving antenna.

Selected directional antennas that are relevant include the following:

Yagi Antennas: Yagi antennas consist of an array of independent antenna elements, with only one of the elements driven to transmit electromagnetic waves. The number of elements (specifically, the number of director elements) determines the gain and directivity. Yagi antennas are not as directional as parabolic dish antennas, but more directional than flat panel antennas.

Flat Panel antennas: Flat panel antennas are just that, configured in a patch type format and physically in the shape of a square or rectangle. Flat panel antennas are quite directional as they have most of their power radiated in one direction in both the vertical and horizontal planes. Flat panel antennas can be made to have varying amounts of gain based on the construction. This can provide excellent directivity and considerable gain.

Parabolic Dish antennas: Parabolic dish antennas use physical features as well as multiple element antennas to achieve extremely high gain and sharp directivity. These antennas use a reflective dish in the shape of a parabola to focus all received electromagnetic waves on the antenna to a single point. The parabolic dish also works to catch all the radiated energy from the antenna and focus it in a narrow beam when transmitting. As shown in FIG. 5, the parabolic dish antenna is very directional. By harnessing all of the antenna's power and sending it in the same direction, this type of antenna is capable of providing high gain.

Slotted Antennas: The slotted antenna exhibits radiation characteristics that are very similar to those of the dipole. The elevation and azimuth patterns are similar to those of the dipole, but its physical construction consists only of a narrow slot cut into ground plane. As with microstrip antennas mentioned below, slotted antennas provide little antenna gain, and do not exhibit high directionality, as evidenced by their radiation plots and their similarity to the dipoles. Their most attractive feature is the ease with which they can be constructed and integrated into an existing design, and their low cost. These factors most often offset their mediocre performance characteristics.

Microstrip Antennas: Microstrip antennas can be made to emulate many of the different styles of antennas explained above. Microstrip antennas offer several tradeoffs that need to be considered. Because they are manufactured with PCB traces on actual PCB boards, they can be very small and lightweight. This comes at the cost of not being able to handle as much output power as other antennas, and they are made for very specific frequency ranges. In many cases, limiting the frequencies that can be received is actually beneficial to the performance of a radio. Due to this characteristic, micro strip antennas are not well suited for wideband communications systems.

The antenna system 150 in FIG. 21 consists of four Directional/Polarized Planar Array Antenna Sectors, wherein each antenna sector can be a micro-strip phased/patch array/flat panel:

2121—Antenna Sector 1 receives the RF signal 2111 from the Antenna Switch Structure 2110,

2122—Antenna Sector 1 receives the RF signal 2112 from the Antenna Switch Structure 2110,

2123—Antenna Sector 1 receives the RF signal 2113 from the Antenna Switch Structure 2110, and

2124—Antenna Sector 1 receives the RF signal 2114 from the Antenna Switch Structure 2110.

The unused antenna sectors can be connected to electric ground potential 2100G. The electric ground potential 2100G may also be also part of the design and implementation of the directional antenna sectors; however, the ground design and implementation are only selectively shown.

FIG. 22 is a is a schematic description of an Antenna System 150, consisting of six directional and/or polarized planar array antenna sectors which are arranged on a cylinder, so that each antenna sector can be a micro-strip phased/patch array/flat panel. The six antenna sectors are selected and controlled via antenna switch structure 2210, in the following way:

2221—Antenna Sector 1 receives the RF signal 2211 from the Antenna Switch Structure 2210,

2222—Antenna Sector 1 receives the RF signal 2212 from the Antenna Switch Structure 2210,

2223—Antenna Sector 1 receives the RF signal 2213 from the Antenna Switch Structure 2210,

2224—Antenna Sector 1 receives the RF signal 2214 from the Antenna Switch Structure 2210,

2225—Antenna Sector 1 receives the RF signal 2215 from the Antenna Switch Structure 2210, and

2226—Antenna Sector 1 receives the RF signal 2216 from the Antenna Switch Structure 2210.

The antenna system in FIG. 22 may further consist of top and bottom antenna sectors at the and the bottom of the cylinder. The unused antenna sectors can be connected to electric ground potential 2200G. The electric ground potential 2200G may also be also part of the design and implementation of the directional antenna sectors; however, the ground design and implementation are only selectively shown.

FIG. 23 is a schematic description of an Antenna System 150, consisting of four directional parabolic-dish-reflector or Yagi/Tube-like antenna sectors that can be used in the current invention. The four antenna sectors are selected and controlled via antenna switch structure 2310. A parabolic antenna consists of a parabolic reflector and a radiating or receiving element at or near its focus. Parabolic antennas are directive and include a preliminary source and a parabolic reflector to focus the energy.

The four Directional Parabolic-dish-reflector Yagi/Tube-like antenna sectors are selected and controlled via antenna switch structure 2310 in the following way:

2321—Antenna Sector 1 receives the RF signal 2311 from the Antenna Switch Structure 2310,

2322—Antenna Sector 1 receives the RF signal 2312 from the Antenna Switch Structure 2310,

2323—Antenna Sector 1 receives the RF signal 2313 from the Antenna Switch Structure 2310, and

2324—Antenna Sector 1 receives the RF signal 2314 from the Antenna Switch Structure 2310.

The unused antenna sectors can be connected to electric ground potential 2300G. The electric ground potential 2300G may also be also part of the design and implementation of the directional antenna sectors; however, the ground design and implementation are only selectively shown.

FIG. 24 is a functional description of the mobile device (MD) and the antenna system (AS) comprised of N antenna sectors coupled to a separate access control unit with a baseband processor by means of transmit/receive coupling (TRC), TRF—transmit RF (radio frequency) and RRF—receive RF. The plurality of separate access control units with baseband processors are coupled to an antenna control unit. This mobile device configuration does not require a switch for switching among the plurality of antenna sectors. In the configuration shown in FIG. 24 the Access Control Unit and Baseband Processor are replicated 2410-1 to 2410-N for controlling the operation of each one of the N directional antenna sectors, which facilitate the soft switch operation in accordance with this invention. The antenna control unit 2420 determines which one of the N Access Control Unit and Baseband Processor should be used—at least one should be selected prior to the transmission of data packets.

FIG. 24 is a wireless system for transmitting and receiving a plurality of data packets. The system consists of a plurality of directional antenna sectors 2450-1 to 2450-N—each having a respective three-dimensional region for transmitting and receiving electromagnetic signals. The system in FIG. 24 has a plurality of access control units—each having a baseband processor 2410-1 to 2410-N and an antenna control unit 2420. Each directional antenna sector transmits an electromagnetic signal in a predefined region in three-dimensional space when coupled to a selected one of the access control with baseband processors 2410-1 to 2410-N.

The directional antenna sectors are coupled to at least one selected one of the access control units 2410-1 to 2410-N for receiving data packets and for measuring at least one received electromagnetic signal analog and digital characteristics. Selected received electromagnetic signal characteristics are transferred to the antenna control unit 2420. The antenna control unit selects at least one of the access control units processor 2410-1 to 2410-N within a first predefined time interval prior to the transmission of at least one data packet responsive to the received electromagnetic analog and digital signal characteristics.

The access control units 2410-1 to 2410-N are comprised of at least one of: 802.11 wireless network adapter, 802.15 wireless network adapter, 802.16 wireless network adapter, 3G cellular phone, 4G cellular phone, mobile device, laptop computer, personal computer, personal digital assistant, cellular phone, 2.5G cellular phone, 3G device, 4G device, 5G device, multimedia devices, GPS (global positioning system) receiver, base stations, wireless access points, access routers, and packet switch line card.

The access control units 2410-1 to 2410-N are coupled to a USB hub coupled to the antenna control unit 2420. The antenna system 150 in FIG. 24 shows each of the plurality of access control units utilizing an 802.11-based device coupled to a USB hub and each coupled to a respective plurality of directional antenna sectors.

FIG. 25 is a description of directional flat panel antenna sector 2500 design principles as a function of: (1) the flat panel rectangle dimensions L1-length and L2-width, and (2) the wavelength lambda. The L1-by-L2 flat panel antenna sector is constructed so that L1 is in the x-y plane and L2 is in the z direction (90 degree or perpendicular to the x-y plane). As shown in FIG. 26, the vertically stackable directional flat panel antenna sectors are put one on top of the other in the z direction. For example, the height of ten vertically stackable directional flat panel antenna sectors is ten times L2 (since L2 is in the z direction). However, in some cases, in order to better cover the three-dimensional space with the directional antenna sectors, each flat panel:

L1 may be tilted in the z direction, and

L2 may be tilted in a defined angle with respect to the x-y plane.

As shown in FIG. 25, the design of the flat panel antenna has the following approximated properties:

2511. g-max≈4*(3.14*{(L1*L2)/(Lambda**2)} [Lambda=speed-of-light/Frequency]

[L1*L2 is the rectangular area of antenna aperture in $cm^2$]

2512. Lambda/L1 and Lambda/L2 are the beam widths— in radians (each radian is 57.3 degrees), which implies that for Lambda=2 cm (15 GHz), L1=4 cm and L2=1 cm, the electromagnetic beam will have the following shape: (2/4)*57.3=28.65 degrees by (2/1)*57.3=114.6 degrees. This formulation implies that the electromagnetic beam opening is inversely proportional to the length and width of the flat panel antenna.

2513. Antenna Gain: G(db)=10 $\log_{10}$(g-max) and for the above example:

G(db)≈10 $\log_{10}$4*(3.14)*{(4*2)/(2*2)}=10 $\log_{10}$8* (3.14)=14 db

Generally, flat panel antennas 2500 are just that, configured in a patch type format and physically in the shape of a square or rectangle. Flat panel antennas 2500 are directional as they have most of their power radiated in one direction in both the vertical and horizontal planes. Flat panel antennas can be made to have varying amounts of gain based upon construction. This can provide excellent directivity and considerable gain. A flat panel antenna is constructed in a panel and is usually a phased array antenna. A phased array antenna is an array antenna in which phases shifts can be applied to the signals received or transmitted from individual elements in such a way that the antenna can be electrically steered. An important advantage of a phased array antenna over a mechanically rotated antenna is the lack of moving parts. One common application of a phased array antenna is as a radar antenna.

FIG. 26 is a functional description of a plurality of vertically stackable flat panel antenna sectors (each antenna sector may be tilted along L1 and/or L2) 2122. Each antenna sector directs the transmission of its electromagnetic energy to a defined different region in three-dimensional space. The vertically stackable flat panel antennas are placed one on top of the width-side L2 of the other. Consequently, the combined electromagnetic signals of the flat panel antennas may overlap to cover the large part of the three-dimensional space. In the above example: Lambda=2 cm (15 GHz), L1=4 cm and L2=1 cm—it is possible to cover 180 degrees of the x-y plane with seven flat panel antennas (each antenna covers 28.65 degrees) with 2-3 degrees of overlapping regions between adjacent segments.

The vertically stackable flat panel antennas that are placed in the x-y plane can be rotated and tilted using electric motor as described in FIG. 8, and as shown in the Side View 2600 of FIG. 26. The moveable directions can be directed with motion control signals in two circular coordinates: v(Phi, Theta)— 2620-H: Phi direction signal and 2620-V: Theta direction signal.

FIG. 27 is a functional description of plurality of vertically stackable Yagi, which is tube-like, directional antenna sectors. Each Yagi/Tube-like antenna sector directs the transmission of its electromagnetic radiation to a defined cone-like region 2354 in three-dimensional space. The vertically stackable Yagi antennas are placed one on top of the other. The radiating element 2343 is placed inside a tube-like reflector 2323, wherein one side of the tube-like directional Yagi antenna is closed and is part of the reflector 2323. The vertically stackable tube-like directional Yagi antennas that are placed in the x-y plane can be rotated and tilted using electric motor as described in FIG. 8. The moveable directions can be directed with motion control signals in two circular coordinates: v(Phi, Theta)—820-H: Phi direction signal and 820-V: Theta direction signal.

The antenna system 150 in FIG. 26 is designed for transmitting and receiving a plurality of data packets. The antenna system 150 consists of a plurality of directional antenna sectors 2122 or 2500 each associated with a respective region of space for transmitting and receiving electromagnetic signals. Each said directional antenna sector 2122 or 2500 is at least one of the following: a flat panel, a planar, a parabolic dish, a slotted, a micro-strip, omni and a Yagi. The antenna control unit 420 selects the manner in which selected ones of said directional antenna sectors are coupled to the transmitted signal prior to the transmitting of at least one data packet. The antenna control unit 420 selects the manner in which selected ones of said directional antenna sectors are coupled to the received signal prior to receiving of at least one data packet. At least one of selected the receivers 430 is selected by the receiving controller 431 to measure the electromagnetic characteristics of the received signal from selected ones of the plurality of directional antenna sectors 2122 or 2500.

The receiving controller 431 selects the directional antenna sectors 2122 or 2500 for measuring the analog and digital characteristics of the incoming electromagnetic signal in at least one of: a predefined manner, an arbitrary manner, a random manner, a predefined manner.

As shown in FIGS. 21, 22, 23 and 27, the directional antenna sector 2122 or 2500 is coupled, at most, in one of the following manners: to transmit a transmitted signal, to receive a received signal, to an electric ground potential; to a predefined electric potential.

As shown in FIGS. 26 and 27, at least two of the plurality of directional antenna sectors are stackable. The antenna system 150 in FIGS. 26 and 27 is constructed of plurality of flat panel antenna sectors 2500 having a width and a length and are aligned according to orientation of the length. The antenna system 150 in FIGS. 26 and 27 is constructed of plurality of flat panel antenna sectors 2500 having a rectangular shape, a width and a length, and are aligned according to orientation of the width. Each of said rectangle antenna sectors 2500 are vertically stackable flat panel antennas 2500 and are oriented to face a selected predefined direction in space.

FIG. 28 is a functional description of a flat panel antenna sector with multiple "patches" 2810 made of a conducting material, with front view 2810 and side view 2820. The "patches" 2810 shape, size and how they are placed on the plane are part of the directional design of the flat panel antenna. The "patches" are placed on dielectric material on top of a ground plan 2840 and are fed by an electric signal 2850. The "patches" 2810 have the electric signal 2850 with different predefined delays, which result in predefined phase shifts of the electromagnetic signal radiated from the "patches" and are part of the directional design of the flat panel antenna. The dielectric material and ground plan 2840 surround the "patches" 2810 with small margins of a small fraction of a wavelength. The typical thickness of the dielectric material and ground plan 2840 is a small fraction of a wavelength. In FIG. 28, the L1 and L2 dimensions of the flat panel antenna determine (approximately) its aperture (as discussed in FIG. 25) when the main radiation lobe is perpendicular to the flat panel. However, when the main radiation lobe is not perpendicular but in angle x from perpendicular, the aperture is approximately $L1*L2*\cos(x)$. This implies that when the transmission is not perpendicular the antenna gain is smaller—see FIG. 25.

The flat panel antenna sector 2500 in FIG. 28 has multiple "patches" 2810 that realize a static-direction phase array structure—"fed" with electric signal that is phase shift via wires of predefined lengths 2850. FIGS. 7, 8, 17 and 18, further describe the dynamic-direction and static-direction operations of phase array antenna in-the present invention.

FIG. 29 is a functional description of an antenna system utilizing six flat panel directional antenna sectors that are attached on a cylinder 2900 forming hexagonal structure. The antenna system contains an antenna control system 2930 that is connected to a computing device 2940 via a communications channel 2950. The antenna apparatus in FIG. 29 is a self-contained antenna structure 2900 (as was also shown in 150/160 in FIGS. 1-2), comprising a plurality of six flat panel directional antennas: 2921, 2922, 2923, 2924, 2925 and 2925, arranged on a cylindrical surface forming an hexagonal structure. Each of the plurality of flat panel directional antennas is comprised of a plurality of "patches" 2810 arranged in a pattern as discussed in FIG. 28.

Alternatively, FIG. 30 is a functional description of an antenna system utilizing four flat panel directional antenna sectors that are attached to an antenna structure 3000 with arms. The plurality of flat panel directional antennas 3021, 3022, 3023 and 3024 can be supported by a structure 3000 that attaches the plurality of said flat panel directional antennas with arms 3030. The antenna system contains an antenna control system 2930 connected to a computing device 2940 via a communications channel 2950.

The antenna system in FIGS. 29-30 includes an antenna control system 2930 that executes various wireless media access control protocols such as IEEE 802.11, IEEE 802.15, and IEEE 802.16. It also includes functionality to select at least one of the flat panel antenna sector for transmitting and receiving data packets as described in detail in FIGS. 4-5, 11-14. The antenna control system 2930 is selectively coupled to the plurality of flat panel directional antennas for selectively communicating data packets to at least one selected one of said plurality of flat panel directional antennas in accordance with predefined criteria determined on a packet-by-packet basis. The coupling of the antenna control system 2930 to the flat panel antennas is done via a switch as discussed, e.g, in FIGS. 4-5, or by using high impedance amplifiers.

The flat panel directional antennas provide receiving electromagnetic signals to the antenna control system 2930 for analog and digital analysis in order to select at least one flat panel directional antenna according to predefined criteria. At least one flat panel directional antenna selected for transmitting and receiving data packets is used for transmitting and receiving group of data packets according to predefined criteria. Specifically, the predefined criteria of the received electromagnetic signal characteristics are determined by at least one of the following: analog processing, digital processing, analog filtering, digital filtering, FEC (forward error correction), bit error-rate analysis, time-of-day analysis, propagation delay analysis, transmitter address analysis, and transmitter identification analysis.

The antenna system in FIGS. 29-30 includes an external computing system 2940, e.g.: a laptop computer, a desktop computer, a personal device, a cell phone. The computing system 2940 is coupled to the antenna control system 2930 via a communications channel 2950 of various predefined types. The computing system 2940 provides is the source and destination of the data packets. The communications channel 2950 utilizes at least one of: a plurality of coax cables, a multi-lead coax cable, a parallel data connection, a serial data connection, a parallel data and control connection, parallel data, a timing and control connection, a PCMCIA (personal computer memory card international association) interface, a USB (universal serial bus), IEEE 1394 (Fire-Wire), an infra red (IR) interface, a free space optical (laser) and a wireless interface. The external computing system 2940 utilizes at least one of the following protocols: IEEE 802.11, IEEE 802.15, IEEE 802.16, CDMA 2000, WCDMA, UMTS, GPRS, 2.5G, 3G, 4G, 5G, GSM.

The flat panel directional antennas are attached to one another at a defined angle. In FIG. 29, the six antennas are attached to one another side-by-side in an angle of 120 degrees. However, the defined angle in which the flat panel directional antennas are attached to one another can be changed in order to maximize efficiency of the antenna system. An adjustable varying of the angle between to adjacent antennas is performed within a predefined range. In one extreme case, all six flat panel directional antennas in FIG. 29 can be attached to one another with zero degree in the same plane, so that all six antennas will be radiating electromagnetic signals in the same direction covering the same region of three-dimensional space.

In another configuration, the six antennas are divided into two groups of three antennas each, wherein each of the three antennas are in the same plane and transmitting in the same direction covering the same region of three-dimensional space.

In FIG. 29, the six antennas are attached to one another side-by-side so that they can fold to occupy less space and be opened only for operation. The flat panel directional antennas are attached to one another at a defined angle that can be changed by mechanical means for changing the defined angles responsive to a control signal.

In FIG. 30, the four antennas are attached with arms 3030 in a fixed orientation to the support antenna structure 3000. In this configuration each antenna 3021, 3022, 3023 and 3024, can be directed independently in three-dimensional space, and their respective directions can be changed mechanically. The capability to vary the antenna orientations in three-dimensional space can be used for at least one of the following: to optimize three-dimensional space coverage, to optimize three-dimensional space antenna system gain. The re-orientation of the flat panel directional antennas is performed by moving at least one of: the arms 3030, the antenna structure 3000, the individual flat panel antenna sector 3021, 3022, 3023 or 3024.

The antenna system in FIGS. 29-30 includes omni-directional antenna 2920 that is used to transmit in all directions. The omni-directional antenna 2920 is coupled to the antenna control system 2930.

FIG. 31 is a schematic description of a vertical slice of cylindrical shape structure such that six such vertical slices with hexagonal arrangement are needed for covering 360°. This vertically stackable example provides for quadruple spatial vertical coverage. The flat panel directional antenna sectors that are arranged in a plurality of vertically stackable slices provides for greater vertical coverage with higher antenna gain. In the example of FIG. 31, there are four antenna sectors in each vertical slice, such that the main radiation lobe of each sector covers 30 degree vertically with combined vertical coverage of 120 degrees. The vertically stackable slices can be positioned as though mounted upon an outer surface of a cylindrically shaped object forming a hexagonal structure.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A wireless system for transmitting and receiving a plurality of data packets, the system comprising:
    a plurality of directional antenna sectors self contained at a first location, each of the plurality of directional antenna sectors having a respective associated three-dimensional region of space for transmitting and receiving electromagnetic signals;
    at least one receiving controller self contained at the first location;
        at least one transmitting controller self contained at the first location;
        wherein said at least one receiving controller is selectively coupled, one at a time, to each one of the plurality of directional antenna sectors, one at a time, to measure received electromagnetic signal characteristics to determine a best-received electromagnetic signal;
        wherein said at least one of said receiving controllers is responsive to the measure of the received electromagnetic signal characteristics from each of the plurality of directional antenna sectors to select one of the directional antenna sectors as a selected directional antenna sector, prior to the transmission of at least one data packet; and
        wherein at least one of said transmitting controllers is selectively coupled to the selected directional antenna sector for transmitting said at least one data packet via the selected directional antenna sector.

2. The system as in claim 1, wherein a selected one of said at least one receiving controller is selectively coupled to selected ones of the directional antenna sectors in a defined order in order to measure received electromagnetic signal characteristics.

3. The system as in claim 1, wherein prior to the transmission of at least one data packet and responsive to the measure of the received electromagnetic signal characteristics, a selected one of said at least one receiving controller selects at least one of the directional antenna sectors as the selected directional antenna sector within a first defined time interval.

4. The system as in claim 1, wherein a selected one of said at least one receiving controller selects at least one of the directional antenna sectors within an order dependent upon history of the received electromagnetic signal characteristics prior to the transmission of at least one data packet.

5. The system as in claim 1, wherein the plurality of directional antenna sectors are part of at least one of: a mobile device, a laptop computer, a desktop computer, a personal digital assistant (PDA), a cordless phone, a wireless phone, a cellular phone, a 2.5G cellular phone, a 3G device, a 4G device, a 5G device, a multimedia device, a GPS (global positioning system) receiver, an electronic book, electronic paper, an automotive, a boat, a ship, an airplane, a train, a satellite, a hand-held device, a base station, an access point, an access router, a UAV (unmanned aerial vehicle), and a packet switch output.

6. The system as in claim 1, wherein the receiving controller is part of at least one of: a mobile device, a laptop computer, a personal digital assistant, a cordless phone, a wireless phone, voice-over IP, a RFID (radio frequency identifier), a cellular phone, a 2.5G cellular phone, a 3G device, a 4G device, a 5G device, a multimedia device, a GPS (global positioning system) receiver, an electronic book, electronic paper, and a packet switch.

7. The system as in claim 1, wherein at least one of the plurality of directional antenna sectors are polarized antennas, and
    wherein each said polarized antenna sector transmits an electromagnetic signal in a defined polarization.

8. The system as in claim 1, wherein each said directional antenna sector transmits in a defined direction that is defined by physical construction of the respective directional antenna sector.

9. The system as in claim 8, wherein each said directional antenna sector is associated with a respective transmission region in three-dimensional space; and
    wherein the respective transmission regions in three-dimensional space are overlapped within defined parts of three-dimensional space.

10. The system as in claim 9, wherein the respective transmission regions in three-dimensional space are defined with accordance to 3 db power lobes.

11. The system as in claim 1, wherein selected ones of the directional antenna sectors are steered antennas, wherein the steered antennas receive and transmit electro-magnetic signals within a defined region in at least one of: two-dimensional space and three-dimensional space.

12. The system as in claim 11, wherein the steered antenna sectors are moveable by at least one of: a step-motor, an electric motor, an electric field, a magnetic field, and a phase array.

13. The system as in claim 1, wherein the directional antenna sectors are arranged in a predefined pattern; and
    wherein the predefined pattern is at least one of: polyhedron, polygon, octahedron, pentagon, cube, pyramid, sectorized cylinder, ball, pentagondodecahedron, and icositetrahedron.

14. The system as in claim 1, wherein there is a plurality of receiving controllers, the system further comprising:
    a receiving switch; and
    wherein selected ones of the receiving controllers are selectively coupled to selected ones of the directional antenna sectors utilizing the receiving switch.

15. The system as in claim 14, wherein the receiving switch is constructed by utilizing high impedance amplifiers.

16. The system as in claim 14, further comprising:
a plurality of receiver radio frequencies devices (RRFs);
wherein the receiving switch has N inputs and R outputs;
wherein the N inputs are selectively connected to the directional antenna sectors; and
wherein the R outputs are selectively connected to selected ones of the plurality of the RRFs.

17. The system as in claim 1, wherein there are a plurality of receiving controllers, and wherein there are a plurality of the transmitting controllers, the system further comprising:
an RF switch,
wherein selected ones of the receiving controllers are selectively coupled to selected ones of the directional antenna sectors utilizing the RF (radio frequency) switch; and
wherein selected ones of the transmitting controllers are selectively coupled to at least one of the directional antenna sectors utilizing the RF switch.

18. The system as in claim 1, wherein there is a plurality of the transmitting controllers, the system further comprising:
a transmitting switch; and
wherein selected ones of the transmitting controllers are selectively coupled to at least one of the directional antenna sectors utilizing the transmitting switch.

19. The system as in claim 18, wherein the transmitting switch is comprised of high impedance amplifiers.

20. The system as in claim 18, further comprising:
a plurality of transmitter radio frequencies devices (TRFs);
wherein the transmitting switch has T inputs and N outputs;
wherein the N outputs are selectively connected to the directional antenna sectors, and
wherein the T inputs are connected to selected ones of the plurality of the TRFs.

21. The system as in claim 1, wherein there are a plurality of the receiving controllers, and
wherein each of the plurality of the receiving controllers is selectively coupled to selected ones of the directional antenna sectors in at least one of: a random order and a defined order for providing for measurement of the received electromagnetic signal characteristics.

22. The system as in claim 1, wherein there are a plurality of the receiving controllers, and
wherein selected ones of the receiving controllers are selectively coupled to selected ones of the directional antenna sectors in at least one of the following patterns: reoccurring, one at a time, two at a time, three at a time, bisection, opposite directions, intersecting sets.

23. The system as in claim 1, wherein the received electromagnetic signal characteristics are provided as signals comprising control information and data information.

24. The system as in claim 23, wherein the control information is representative of at least one of: RSSI (received signal strength indicator), power, polarization, SNR (signal-to-noise-ratio), Doppler shift, packet source identification, transmitting identification, base station identification, access point identification, bit error-rate, phase-shift, wherein the control information is processed to determine the received electro-magnetic characteristics.

25. The system as in claim 23, wherein the received electromagnetic signal characteristics are determined by at least one of the following: RSSI (received signal strength indicator) analysis, analog processing, digital processing, analog filtering, digital filtering, FEC (forward error correction), bit error-rate analysis, time-of-day analysis, propagation delay analysis, transmitter address analysis, and transmitter identification analysis.

26. The system as in claim 23, wherein the control information is used by a selected one of the receiving controllers to select at least one of the plurality of directional antenna sectors.

27. The system as in claim 23, further comprising:
an antenna control unit; and
wherein the control information is used by the antenna control unit to select at least one of the plurality of directional antenna sectors.

28. The system as in claim 1, wherein the directional antenna sectors are physically arranged into a shape having a plurality of facets, wherein each directional antenna sector transmits electromagnetic signals in a defined direction in three-dimensional space, and
wherein the defined direction in three-dimensional space is at least one of: perpendicular to a polyhedron facet, perpendicular to a pyramid facet, perpendicular to a cube facet, a predefined angle with respect to a polyhedron facet, a predefined angle with respect to a pyramid facet, a predefined angle with respect to a cube facet, a predefined angle with respect to a octahedron facet, and a predefined angle with respect to a pentagondonecahedron facet.

29. The system as in claim 23, further comprising:
means for detecting an identification source of the received electromagnetic signal responsive to the control information;
wherein there is a plurality of the receiving controllers;
wherein a selected one of the receiving controllers selects at least one of the directional antenna sectors prior to transmission of at least one data packet and responsive to the received electromagnetic signal characteristics and the identification of the source of the best-received electromagnetic signal;
wherein there are a plurality of the transmitting controllers; and
wherein a selected one of the transmitting controllers is selectively coupled to at least one of the directional antenna sectors to transmit at least one data packet as selected by the selected one of the receiving controllers.

30. The system as in claim 29, wherein the identification source is at least one of:
a wireless access point, a base station, a cellular phone base station, a mobile device, an 802.11 device, an 802.15 device, an 802.16 device, a laptop computer, a desktop computer, a personal digital assistance, and a cellular phone.

31. A wireless method for transmitting and receiving a plurality of data packets, the method comprising:
providing a plurality of directional antenna sectors in three-dimensional space self contained at a first location;
selecting as selected directional antenna sectors, at least one of said plurality of directional antenna sectors, for receiving of an electromagnetic signal;
coupling each one of said selected directional antenna sectors, one at a time, for measuring electromagnetic signal characteristics of the electromagnetic signal at the first location; and
selecting at least one of said plurality of directional antenna sectors as a selected directional antenna sector, to transmit at the first location an electromagnetic signal comprising at least one data packet responsive to the measuring the received electromagnetic signal characteristics to determine a best-received electromagnetic signal.

32. The method as in claim 31, further comprising:
utilizing steered directional antenna sectors to orient the directional antenna sectors.

33. The method as in claim 31, further comprising:
arranging the directional antenna sectors in a defined physical pattern.

34. The method as in claim 31, further utilizing:
converting the received electromagnetic signal to provide control information and data information.

35. The method as in claim 34, wherein the control information is representative of at least one of the following: power, polarization, SNR (signal-to-noise-ratio), Doppler shift, phase shift, packet source identification, transmitting identification, base station identification, access point identification.

36. The method as in claim 34, further comprising:
determining the electromagnetic signal characteristics by at least one of the following: analog processing, digital processing, analog filtering, digital filtering, FEC (forward error correction), bit error rate analysis, RSSI (received signal strength indicator) analysis, timing analysis, time-of-day analysis, propagation delay analysis, transmitter address analysis, communications channel analysis and transmitter identification analysis.

37. The method as in claim 31, further comprising:
communicating the electromagnetic signal via a plurality of channels.

38. The method as in claim 37, further comprising:
selecting at least one of the plurality of channels responsive to defined performance selection criteria.

39. The method as in claim 38, wherein the defined performance selection criteria is at least one of the following: analog processing, digital processing, analog filtering, digital filtering, FEC (forward error correction), bit error rate analysis, RSSI (received signal strength indicator) analysis, timing analysis, time-of-day analysis, propagation delay analysis, transmitter address analysis, communications channel analysis and transmitter identification analysis.

40. The system as in claim 1, wherein the received electromagnetic signal characteristics are stored in a first buffer providing memory for storage; and
wherein the receiving controller selects responsive to the received electromagnetic signal characteristics as stored in the first buffer.

41. The method as in claim 31, further comprising: transmitting the electromagnetic signal as a transmitted signal in a defined region in space prior to transmitting of at least one data packet responsive to the electromagnetic signal characteristics.

42. A method for transmitting and receiving a plurality of data packets, the method comprising:
receiving and measuring, self contained at a first location, electromagnetic signals via a plurality of directional antenna sectors self contained at the first location, each of said directional antenna sectors having a respective associated three-dimensional region of space;
determining, at the first location, of received electromagnetic signal characteristics responsive to the measuring at each one of the directional antenna sectors to determine a best-received electromagnetic signal;
selecting at least one of the directional antenna sectors as a selected directional antenna sector, responsive to the determining of the best-received electromagnetic signal; and
transmitting, at the first location, at least one data packet via the selected directional antenna sector.

43. The method as in claim 42, wherein the determining of the best-received electromagnetic signal is determined by at least one of the following: RSSI (received signal strength indicator) analysis, analog processing, digital processing, analog filtering, digital filtering, FEC (forward error correction), bit error-rate analysis, time-of-day analysis, propagation delay analysis, transmitter address analysis, and transmitter identification analysis.

44. The method as in claim 42, further comprising:
physically arranging the directional antenna sectors into a shape having a plurality of facets, wherein each of the directional antenna sectors transmit electromagnetic signals in a defined direction in three-dimensional space, and
wherein the defined direction in three-dimensional space is at least one of: perpendicular to a polyhedron facet, perpendicular to a pyramid facet, perpendicular to a cube facet, a predefined angle with respect to a polyhedron facet, a predefined angle with respect to a pyramid facet, a predefined angle with respect to a cube facet, a predefined angle with respect to a octahedron facet, and a predefined angle with respect to a pentagondonecahedron facet.

45. The method as in claim 42, further comprising:
detecting an identification source of the received electromagnetic signal responsive to control information;
selecting at least one of the directional antenna sectors as a selected directional antenna sector, prior to transmission of at least one data packet and responsive to the determining of the best-received electromagnetic signal and the identification of the source of the received electromagnetic signal; and
selectively coupling the selected directional antenna sectors to transmit at least one data packet.

46. The system as in claim 40,
wherein the at least one of said transmitting controllers is selectively coupled to at least one of the directional antenna sectors for a first defined time interval for the transmission of at least one data packet responsive to the received electromagnetic signal characteristics stored in the first buffer.

47. The system as in claim 46, wherein at least one of the at least one said receiving controller is coupled to at least one of the directional antenna sectors for a second defined time interval for receiving of at least one data packet, responsive to the received electromagnetic signal characteristics stored in the first buffer.

48. The system as in claim 40, wherein the at least one said receiving controller is selectively coupled to the directional antenna sectors in a defined order responsive to the electromagnetic signal characteristics stored in the first buffer.

49. The system as in claim 40, wherein the at least one said receiving controller is selectively coupled to the directional antenna sectors in at least one of the following patterns, responsive to the electromagnetic signal characteristics stored in the first buffer as at least: one directional antenna sector at a time, two directional antenna sectors at a time, three directional antenna sectors at a time.

50. The system as in claim 40, further comprising:
a wireless device contains at least one of: the plurality of antenna sectors, the receiving controller; the transmitting controller and the first buffer; and
an antenna system comprises at least one of: the plurality of directional antenna sectors, the at least one said receiving controller; the at least one said transmitting controller and the first buffer.

51. The system as in claim 50, wherein the wireless device and the antenna system are coupled to each other by at least one of the following: a plurality of coax cables, a multi-lead coax cable, a parallel data connection, serial data connection, a parallel data and control connection, a parallel data, a timing and control connection, a PCMCIA (personal computer memory card international association) interface, a USB (universal serial bus) interface, an IEEE 1394 (Fire-Wire) interface, an infra red (IR) interface, a free space optical laser interface, and a wireless interface.

52. The system as in claim 50, further comprising:
    an access control unit for managing the transmitting and receiving of the data packets, and
        wherein the access control unit is part of at least one of: the wireless device and the antenna system.

53. The system as in claim 50, further comprising:
    an antenna control unit for managing selection of the directional antenna sectors;
        wherein the antenna control unit is part of at least one of: the wireless device and the antenna system; and
        wherein the antenna control unit processes the received electromagnetic signal characteristics stored in the first buffer to select at least one of the directional antenna sectors for the first predefined time interval for transmission of data packets.

54. The system as in claim 53, wherein the antenna control unit performs parts of at least one of the following protocols: IEEE 802.11, IEEE 802.15, IEEE 802.16, CDMA 2000, WCDMA, UMTS, GPRS, 2.5G, 3G, 4G, 5G, and GSM.

55. The system as in claim 50, wherein the wireless device is part of at least one of the following: a laptop computer, a personal computer, a personal digital assistant, a cellular phone, a 2.5G cellular phone, a 3G device, a 4G device, a consumer electronic game, a multimedia device, a videoconferencing system, a wireless packet audio system, a wireless packet video system, an electronic book, a home entertainment system, electronic paper, a GPS (global positioning system) receiver, an automotive, a boat, a ship, an airplane, a trains, a satellite, a hand-held device, a base stations, a wireless access point, an access router, an electronic scanner, a UAV (unmanned aerial vehicle), and a packet switch.

56. The system as in claim 40, further comprising:
    at least one omni antenna, and
        wherein the at least one said omni antenna is coupled to at least one of the following: said at least one said receiving controller and said at least one said transmitting controller.

57. The system as in claim 40, wherein each of the directional sector antennas is selected from at least one of the following types: flat panel, parabolic dish, slotted, microstrip, yagi, omni, and planar.

* * * * *